(12) United States Patent
Woodman et al.

(10) Patent No.: US 11,668,938 B2
(45) Date of Patent: Jun. 6, 2023

(54) WEARABLE IMAGING DEVICE

(71) Applicant: GoPro, Inc., San Mateo, CA (US)

(72) Inventors: Nicholas D. Woodman, Big Sky, MT (US); Daniel J. Coster, Oakura (NZ); Joshua T. Druker, Redwood City, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 17/488,513

(22) Filed: Sep. 29, 2021

(65) Prior Publication Data

US 2022/0019083 A1 Jan. 20, 2022

Related U.S. Application Data

(63) Continuation of application No. 16/462,732, filed as application No. PCT/US2017/068922 on Dec. 29, 2017, now Pat. No. 11,163,161.
(Continued)

(51) Int. Cl.
| | |
|---|---|
| *G02B 27/01* | (2006.01) |
| *G06F 3/16* | (2006.01) |
| *H04N 23/54* | (2023.01) |
| *H04N 23/55* | (2023.01) |
| *H04N 23/57* | (2023.01) |
| *H04N 23/66* | (2023.01) |

(52) U.S. Cl.
CPC ....... *G02B 27/0172* (2013.01); *G02B 27/017* (2013.01); *G06F 3/167* (2013.01); *H04N 23/54* (2023.01); *H04N 23/55* (2023.01); *H04N 23/57* (2023.01); *H04N 23/66* (2023.01); *G02B 2027/0138* (2013.01); *G02B 2027/0178* (2013.01)

(58) Field of Classification Search
CPC ... G02B 27/0172; G02B 27/017; G06F 3/167; H04N 5/2253; H04N 5/2254; H04N 5/2257; H04N 5/23203
USPC .......................................... 345/158; 455/566
See application file for complete search history.

(56) References Cited

U.S. PATENT DOCUMENTS

| | | |
|---|---|---|
| 6,091,546 A | 7/2000 | Spitzer |
| 9,678,338 B1 | 6/2017 | Bamberger |
| (Continued) | | |

OTHER PUBLICATIONS

PCT International Preliminary Report on Patentability for Application No. PCT/US2017/068922, dated Jul. 11, 2019, 13 pages.
(Continued)

*Primary Examiner* — Prabodh M Dharia
(74) *Attorney, Agent, or Firm* — Young Basile Hanlon & MacFarlane, P.C.

(57) ABSTRACT

A device including a frame that has first and second openings and a pair of temple arms that pivot relative to the frame. The device includes an imaging unit connected to the frame at a location adjacent to the first opening and capture images through the first opening. The device includes a mechanical switch disposed on the frame or the imaging unit adjacent to the first opening. The device includes lenses fitted within the first and second openings, and the lens that fits within the first opening includes a key interfaceable with the mechanical switch and configured to adjust firmware of the imaging unit based on physical features of the lenses upon interface with the mechanical switch.

20 Claims, 10 Drawing Sheets

Related U.S. Application Data

(60) Provisional application No. 62/489,536, filed on Apr. 25, 2017, provisional application No. 62/440,729, filed on Dec. 30, 2016.

(56) References Cited

U.S. PATENT DOCUMENTS

| | | | | |
|---|---|---|---|---|
| 9,837,043 | B1* | 12/2017 | Patel | G06T 19/006 |
| 2002/0025837 | A1* | 2/2002 | Levy | G06F 3/0235 |
| | | | | 455/566 |
| 2007/0026371 | A1 | 2/2007 | Wood | |
| 2008/0131111 | A1* | 6/2008 | Messina | G03B 15/00 |
| | | | | 348/E5.029 |
| 2013/0314303 | A1 | 11/2013 | Osterhout | |
| 2014/0266988 | A1 | 9/2014 | Fisher | |
| 2015/0049487 | A1 | 2/2015 | Connor | |
| 2015/0277123 | A1* | 10/2015 | Chaum | G02B 27/017 |
| | | | | 348/62 |
| 2016/0063327 | A1 | 3/2016 | Yasutake | |
| 2016/0074724 | A1 | 3/2016 | Terre | |
| 2016/0104511 | A1* | 4/2016 | An | G11B 27/10 |
| | | | | 386/241 |
| 2016/0147071 | A1 | 5/2016 | Fujishiro | |
| 2017/0059965 | A1 | 3/2017 | Kobayashi | |
| 2017/0108456 | A1* | 4/2017 | Alizadeh | C04B 40/0096 |
| 2018/0004248 | A1 | 1/2018 | Mascaro | |
| 2018/0008141 | A1 | 1/2018 | Krueger | |
| 2018/0136475 | A1 | 5/2018 | Cazalet | |
| 2019/0253670 | A1 | 8/2019 | Chien | |
| 2020/0119433 | A1 | 4/2020 | Ashwood | |

OTHER PUBLICATIONS

PCT International Search Report and Written Opinion for PCT/US2017/068922 dated Jul. 6, 2018, 20 pages.

* cited by examiner

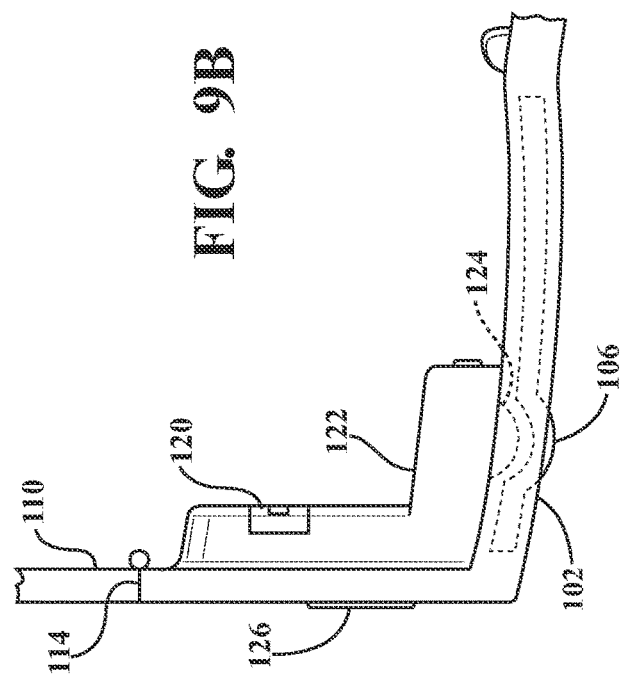
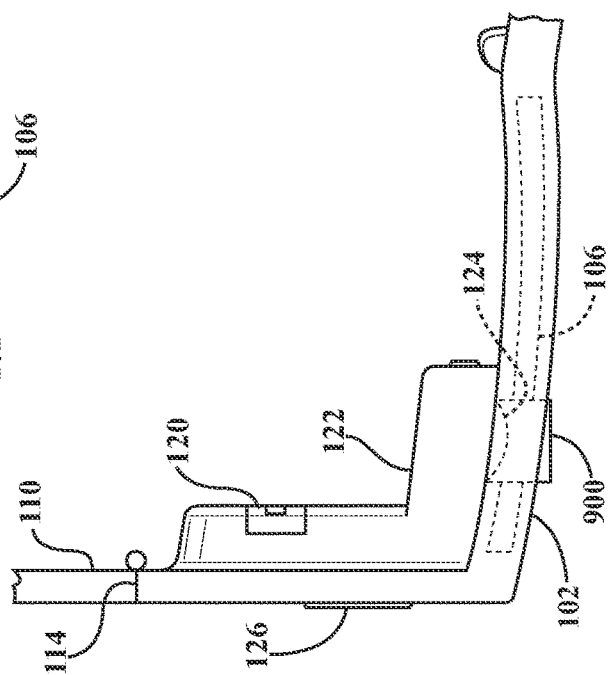
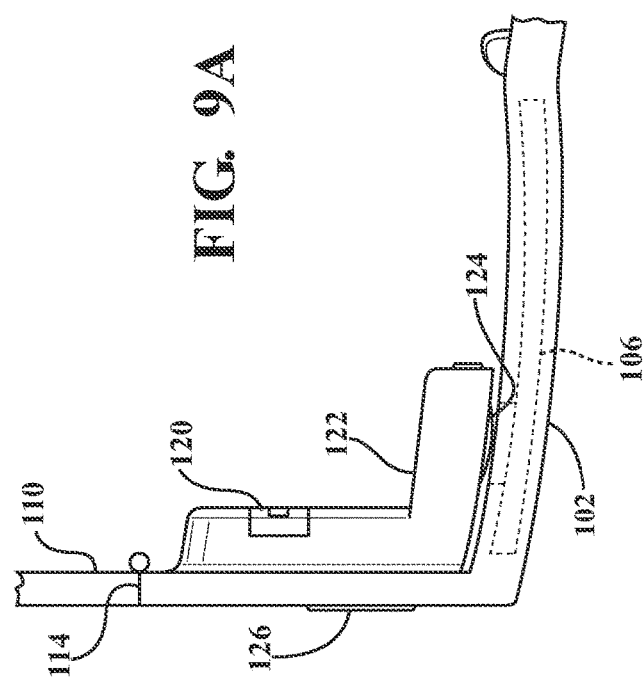

WEARABLE IMAGING DEVICE

CROSS-REFERENCE TO RELATED APPLICATION(S)

This application is a continuation of U.S. application Patent Ser. No. 16/462,732, filed May 21, 2019, which is a U.S. National Stage Application of International Application Patent Serial No. PCT/US2017/068922, filed Dec. 29, 2017, which claims priority to and the benefit of U.S. Provisional Application Patent Ser. No. 62/489,536, filed April 25, 2017, and U.S. Provisional Application Patent Ser. No. 62/440,729, filed Dec. 30, 2016, the entire disclosures of which are hereby incorporated by reference.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

TECHNICAL FIELD

The present disclosure relates generally to digital image and/or video capture, and more particularly, to capturing images and/or video with a wearable imaging device.

BACKGROUND

Imaging devices capture images and videos using one or more lenses that gather light to be focused onto an image sensor. Users seek to record both day-to-day and high-intensity activities varying from playing with children at the park, to attending a wedding, to snowboarding, surfing, biking, etc. Existing mounting solutions, which secure imaging devices to various surfaces to allow for hands-free operation may protect the imaging devices from physical and environmental damage but may not provide a first-person perspective or an unobtrusive, hands-free solution for image and video capture. An imaging device that is unobtrusive, captures images from the user's vantage point, and includes easy-to-use operational interfaces can beneficially improve a user's experience with the imaging device.

BRIEF DESCRIPTION OF THE DRAWINGS

FIGS. 9A, 9B, 9C show partial top views of the wearable imaging device of FIGS. 1-8.

Figure 1:
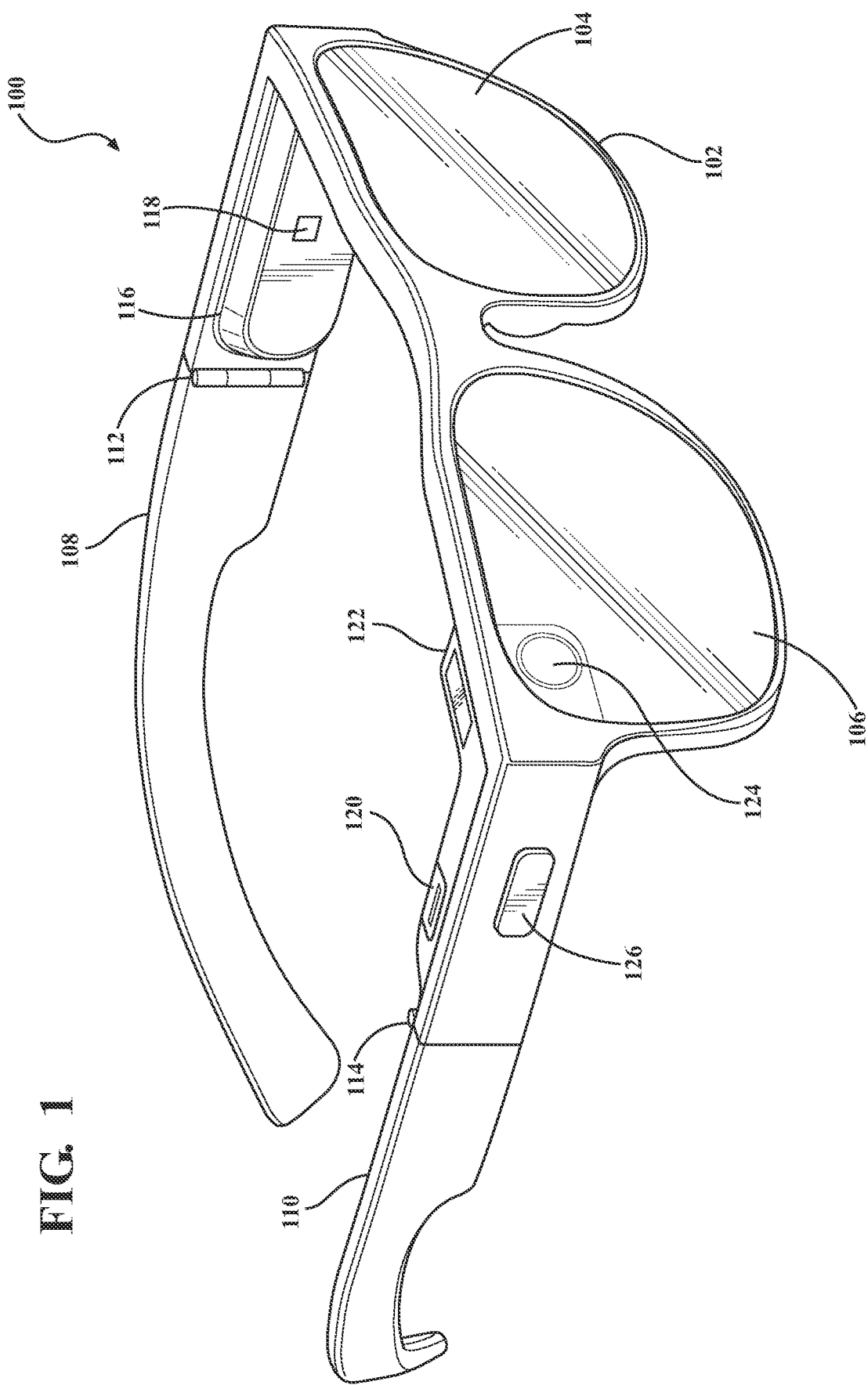
FIG. 1 shows a right-side perspective view of a wearable imaging device.

All Figures disclosed herein are © Copyright 2017 GoPro Inc. All rights reserved.

SUMMARY

The present disclosure describes implementations of wearable imaging devices.

In a first aspect, a wearable imaging device is disclosed that comprises: a frame defining openings aligned to a field of view of a user when the wearable imaging device is in a wearable position with the frame disposed on a face of the user; a pair of temple arms each extending from one end of the frame and moveable between the wearable position and a folded position for collapsing the pair of temple arms toward the frame; lenses disposed within the openings of the frame; an imaging unit disposed on the frame and comprising an imaging lens that captures light through at least one of the lenses; an electronics unit disposed on the frame and in communication with the imaging unit; a power source disposed on the frame and providing power to the imaging unit and to the electronics unit; and an input/output module disposed on at least one of the imaging unit, the electronics unit, or the power source that includes a communications interface for communicating with one or more external devices.

In a second aspect, a wearable imaging device is disclosed that comprises: a frame defining openings; a pair of temple arms each removably coupled to one end of the frame, one of the pair of temple arms extending from one side of the frame and the other of the pair of temple arms extending from an opposite side of the frame; lenses disposed within the openings of the frame; an imaging unit removably coupled to the frame, the imaging unit including an imaging lens that captures light through at least one of the lenses; a power source coupled to the frame and providing power to the imaging unit; a communications interface coupled to the frame and providing communications with one or more external devices; and a control interface in communication with the imaging unit, the control interface receiving audio commands from a user to operate the wearable imaging device.

In a third aspect, a device is disclosed that comprises: a frame; a pair of lenses removably coupled to the frame; an imaging unit removably coupled to the frame, the imaging unit including an imaging lens and an electronics unit; a power source coupled to the frame, the power source providing power to the imaging unit; and a communications unit coupled to the frame for communicating with one or more external devices.

In a fourth aspect, a device includes a frame that has first and second openings and a pair of temple arms that pivot relative to the frame. The device includes an imaging unit connected to the frame at a location adjacent to the first opening and capture images through the first opening. The device includes a mechanical switch disposed on the frame or the imaging unit adjacent to the first opening. The device includes lenses fitted within the first and second openings, and the lens that fits within the first opening includes a key interfaceable with the mechanical switch and configured to adjust firmware of the imaging unit based on physical features of the lenses upon interface with the mechanical switch.

In a fifth aspect, a wearable imaging device includes a frame having openings and an imaging unit connected with the frame at a location adjacent to one of the openings. The wearable imaging device includes an electronics unit connected with the frame and in communication with the imaging unit. The wearable imaging device includes a mechanical switch disposed on or in the frame and a power source disposed on the frame and providing power to the imaging unit and to the electronics unit. The wearable imaging device includes a pair of lenses disposed within the openings and one of the lenses of the pair of lenses including a key interfaceable with the mechanical switch that controls firmware settings of the imaging unit based on physical features of the pair of lenses.

In a sixth aspect, a wearable imaging device includes a frame having openings and an imaging unit including an imaging lens that captures images through one of the openings. The wearable imaging device includes a communications interface in communication with the imaging unit, and the communications interface receives commands from a user to operate the imaging unit. The wearable imaging device includes a power source that supplies power to the imaging unit and/or the communications interface. The wearable imaging device includes frame lenses disposed within the openings, and one of the frame lenses includes a lens housing configured to seal the imaging lens against an external environment.

These and other aspects of the present disclosure are disclosed in the following detailed description of embodiments, the appended claims, and the accompanying drawings.

DETAILED DESCRIPTION

Implementations of the present technology will now be described in detail with reference to the drawings, which are provided as illustrative examples so as to enable those skilled in the art to practice the technology. Notably, the figures and examples below are not meant to limit the scope of the present disclosure to a single implementation or embodiment, but other implementations and embodiments are possible by way of interchange of or combination with some or all of the described or illustrated elements. Wherever convenient, the same reference numbers will be used throughout the drawings to refer to same or like parts.

FIG. 1 shows a right-side perspective view of a wearable imaging device 100. The wearable imaging device 100 may take the form of eyewear, such as a pair of glasses or sunglasses, having a frame 102. The frame 102 may be shaped so as to perch on a face of a user of the wearable imaging device 100 when in a wearable position. The frame 102 may be formed of metal, plastic, composite, wood, and/or any other suitable wearable material. The frame 102 may be shaped to define openings that hold a pair of lenses 104, 106. Each of the lenses 104, 106 may be disposed within one of the openings on one end or one side (i.e., a front end or a side) of the frame 102 and mounted so to as to be in a field of view of the user when the frame 102 is disposed on a face, for example, perched on the nose, of the user in the wearable position. Each of the lenses 104, 106 may be clear, shaded, partially shaded, opaque, reflective, and/or otherwise treated so as to allow selective, partial, and/or complete visibility through the lenses 104, 106 by the user of the wearable imaging device 100. Each of the lenses 104, 106 may be interchangeable so that the user can use different types of lenses for varying conditions (e.g., anti-fog lens for skiing or shaded lens for daytime wear).

The wearable imaging device 100 may include a pair of temple arms 108, 110. Each of the pair of temple arms 108, 110 may be coupled to a respective side of the frame 102, for example, using hinges 112, 114 as shown. Other adjustment mechanisms (not shown) can also be used so as to allow the temple arms 108, 110 to move between an open or wearable position as shown in FIG. 1 to a closed, collapsed, or folded position (see FIG. 6) suitable for storage of the wearable imaging device 100. In the folded position, the temple arms 108, 110 may also be used to hook the wearable imaging device 100 onto, for example, a pocket or a shirt collar of the user. When the wearable imaging device 100 has the temple arms 108, 110 in the folded position and is hooked onto clothing of the user, an orientation of the wearable imaging device 100 may be generally vertical. This vertical orientation is substantially perpendicular to an orientation of the wearable imaging device 100 when the frame 102 is perched on a face of the user and the temple arms 108, 110 are in the open or wearable position. That is, the wearable imaging device 100 has a generally horizontal orientation when worn on a face of the user.

The temple arms 108, 110 may be coupled to the frame 102 using, for example, the hinges 112, 114 at first ends and include shaped pieces or portions suitable for hooking to ears of the user (or, for example, a shirt of the user) at second ends. The temple arms 108, 110 may be formed of metal, plastic, composite, wood, and/or any other suitable wearable material. In some implementations, the frame 102 and the temple arms 108, 110 may have a unitary construction, that is, the hinges 112, 114 or other adjustment mechanisms may not be present and the temple arms 108, 110 may be fixed in position or flexible, but not necessarily foldable, in respect to the frame 102.

The wearable imaging device 100 may include an electronics unit 116 coupled to, mounted to, and/or partially disposed within the frame 102. In the example of FIG. 1, the electronics unit 116 is located proximate to the temple arm 108, forward of the hinge 112. Thus, the hinge 112 is located behind the electronics unit 116, and any repositioning of the temple arm 108 in reference to the frame 102 will not reposition any portion of the electronics unit 116. The electronics unit 116 may include components required to operate and interface with the wearable image device 100, such as controllers, processors, storage (fixed and/or removable), communications, circuitry, inputs, outputs, and/or other components further described below.

The wearable imaging device 100 may include a sensor 118, for example, disposed on or in communication with the electronics unit 116. The wearable imaging device 100 may include one or more sensors (including or in addition to the sensor 118) of varying types. The one or more sensors (including the sensor 118) can be coupled to any component of the wearable imaging device 100 including but not limited to the frame 102. The sensor 118 may be configured to capture audio information (e.g., using a microphone), visual information (e.g., using an image sensor), biometric information (e.g., using a proximity sensor, a heart rate sensor, a heat detection sensor, and/or a sensor that determines gaze direction), or any other information useful for either the imaging unit 122 or the electronics unit 116 to configure operation of the wearable imaging device 100. Therefore, the one or more sensors may comprise any of audio sensors, visual sensors, biometric sensors, health monitoring sensors, MEMS sensors, nanosensors, and any combination thereof. The sensor 118 shown in FIG. 1 faces the user from a position inside the frame 102 extending from the electronics unit 116, though other positions for the sensor 118 and any additional sensors (not shown) are also possible (e.g., the sensor 118 can be coupled to the imaging unit 122).

In some implementations, the sensor 118 includes an eye/pupil tracking sensor (also referred to as an eye/pupil tracking device) that can track movements of aspects of the user's eye including but not limited to pupillary movements. The wearable imaging device 100 can include multiple eye/pupil tracking sensors so that both eyes of the user of the wearable imaging device 100 can be tracked simultaneously. For example, the pupillary movements can be tracked to auto-focus an imaging unit of the wearable imaging device 100 (such as the imaging unit 122 further described below) on a desired subject for image/video capturing. If the user looks at a certain object to the left, the imaging unit of the wearable imaging device 100 can focus and capture content of the certain object. In some implementations, information associated with the tracked pupillary movements can be processed by the electronics unit 116 to activate certain actions associated with the imaging unit of the wearable imaging device 100 or the wearable imaging device 100 itself. In one example, if the eye/pupil tracking sensor detects that the user has blinked, image capture by the imaging unit of the wearable imaging device 100 can be activated. In another example, if the eye/pupil tracking sensor detects that the user has blinked or closed their eyes for a predetermined time period, a shut-down process of the wearable imaging device 100 can be activated.

Therefore, the eye/pupil tracking can be used for a variety of tasks including but not limited to visual imaging tasks and focusing tasks. In addition, the eye/pupil tracking can be used in combination with neural networks, visual processing units and computer vision algorithms to determine relevant information about a subject that the user has fixed their gaze (i.e., vantage point, point-of-view, etc.) on during usage (e.g., encoding) of the wearable imaging device 100. For example, a user wearing or using the wearable imaging device 100 can look at a dress in a shop window and the eye/pupil tracking can note the user's gaze and corresponding positioning and duration information and can highlight associated captured content (i.e., content associated with the user's gaze which in this example is the dress in the shop) as potentially relevant to the user. Using machine learning techniques including but not limited to neural networks, a visual processor or computer vision algorithm of the wearable imaging device 100 can be used to determine the subject of a user's gaze and relevant information including but not limited to product information, pricing information, sales information, and availability via e-commerce platforms (e.g., the dress is sold at a certain store for a certain price, etc.). This relevant information can be provided to the user either via the wearable imaging device 100 itself or via other devices (e.g., external device such as the user's smartphone connected to the wearable imaging device 100) in the forms of advertisements, search engine results, etc. This enables the wearable imaging device 100 to provide a commercialized form of augmented reality image capture and image analysis.

The wearable imaging device 100 may include a power source 120, such as a removable or rechargeable or disposable battery or other suitable smaller, portable power supply, coupled to, mounted to, and/or partially disposed within the frame 102. The power source 120 can be a solar cell that continuously recharges itself while the wearable imaging device 100 is in use (e.g., a user wearing the wearable imaging device 100 outdoors). In the example of FIG. 1, the power source 120 is located proximate to the temple arm 110, forward of the hinge 114. Thus, the hinge 114 is located behind the power source 120, and any repositioning of the temple arm 110 in reference to the frame 102 will not reposition any portion of the power source 120. The power source 120 may be coupled to the electronics unit 116, for example, in a wired or wireless manner across the frame 102, in order to provide power to the electronics unit 116 and to the sensor 118. In some implementations, the electronics unit 116, the sensor 118, and the power source 120 may be located together, for example, disposed on and/or within the side of the frame 102 proximate to the temple arm 108, forward of the hinge 112.

The wearable imaging device 100 may include an imaging unit 122. The imaging unit 122 can also be referred to as an imaging sensor or as an image sensor. The imaging unit 122 may be positioned proximate to the power source 120 on the frame 102 as shown or as a stand-alone module with the power source 120 positioned proximate to the electronics unit 116. The imaging unit 122 may be positioned or coupled to other areas of the wearable imaging device 100 providing unobstructed views including but not limited to being coupled between the lens 104, 106 proximate to a bridge portion (i.e., portion near the nose of the user when the user is wearing the wearable imaging device 100) of the frame 102.

As shown in FIG. 1, the power source 120 can be embedded within or form a part of the imaging unit 122. In another example, the power source 120 and the imaging unit 122 can be integrated into a single component. In yet another example, the power source 120 can be coupled to another area of the wearable imaging device 100 including but not limited to being embedded within or forming a part of the electronics unit 116. The wearable imaging device 100 can include multiple power sources (e.g., the power source 120 powering the imaging unit 122 and another power source powering other components of the wearable imaging device 100 including but not limited to the electronics unit 116).

The imaging unit 122 may include an outward-facing imaging lens 124 positioned, for example, behind the lens 106 disposed within the frame 102. The positioning of the imaging lens 124 behind the lens 106 (or in another location including but not limited to behind the lens 104 or between the lenses 104, 106 and proximate the bridge portion of the frame 102) enables an unobstructed view of a subject (e.g., scenery) for content capture. Thus, the imaging lens 124 of the imaging unit 122 captures light through the lens 106 of the wearable imaging device 100 and is not visible or is unobtrusively visible when viewed from a position external to the user of the wearable imaging device 100. The wearable imaging device 100 can include at least another imaging unit (not shown) with another imaging lens positioned behind the lens 104 disposed within the frame 102. In some implementations, the imaging unit 122 can be attached and detached from the frame 102 so the same imaging unit 122 can be positioned behind both the lens 104 and the lens 106. Therefore, the imaging unit 122 can be removably coupled to the frame 102 or other aspects of the wearable imaging device 100 thereby enabling a user of the wearable imaging device 100 to upgrade the wearable imaging device 100 by only interchanging or upgrading the imaging unit 122.

The imaging lens 124 can include a variety of lens types including but not limited to a wide-angle lens with a wide-angle field-of-view (FOV) to better emulate human vision. The imaging lens 124 can be interchangeable (in addition to the imaging unit 122 being interchangeable) to enable a user of the wearable imaging device 100 to customize the imaging lens 124 based on varying conditions. In one example, the imaging lens 124 can be a wide-angle lens for scenic landscape shots, and in another example, the imaging lens 124 can be a close-up lens for close-up shots. The imaging lens 124 can comprise a variety of lens types including but not limited to close-up lenses, macro lenses, zoom lenses, apochromat (APO) lenses, process lenses, enlarger lenses, aerial photography lenses, wide-angle lenses, ultra-wide-angle lenses, fisheye lenses, stereoscopic lenses, soft-focus lenses, infrared lenses, ultraviolet lenses, swivel lenses, shift lenses, and tilt/shift lenses.

The imaging unit 122 can include an optics system that is associated with the imaging lens 124 and the way in which the images are recorded by the imaging unit 122. The optics system can be optimized for a variety of factors including but not limited to best emulating human vision. In a first configuration, positioning of the optics system is static. In other words, the optics system positioning is static but optimized by providing predetermined positioning for any of yaw, pitch, and roll of the optics system. For example, the optics system of the imaging unit 122 can be positioned (e.g., via yaw, pitch, and roll) in a way that is optimized for a certain activity including but not limited to surfing. In a second configuration, positioning of the optics system is dynamic. In other words, the optics system positioning can be dynamically altered based on what the user of the wearable imaging device 100 is doing (e.g., surfing, running, etc.) to provide a more authentic point-of-view (POV). In some implementations, the positioning of the optics system is dynamically altered by changing any of yaw, pitch, and roll of the optics system. The positioning of the optics system can be altered in response to detection of a certain trigger (e.g., the wearable imaging device 100 detecting that the user is engaged in the activity of surfing) or in response to receiving a certain command (e.g., an audio command to change the positioning). Therefore, the positioning of the optics systems can be manually changed by the user of the wearable imaging device 100 (e.g., an advanced user optimizing settings) or automatically changed by the wearable imaging device 100 itself.

The imaging unit 122 may be configured to adjust image and/or video capture based on the transmissibility and/or opacity of the lens 106 of the wearable imaging device 100, that is, depending on shading level, reflectivity, etc. Depending on the properties of the lens 106, the imaging unit 122 may adjust color, white balance, and/or exposure to compensate for image capture occurring through the lens 106. In some examples where the imaging lens 124 is fixed in respect to and/or sealed to the lens 106, these adjustments may be tuned specifically to the tint or shading of the lens 106 or other characteristics or properties of the lens 106. In other examples, the imaging unit 122 may be adaptable so as to use a first tuning mode with a lens having first properties (e.g., a lighter-shaded or lower-reflectivity lens) and a second tuning mode with a lens having second properties (e.g., a darker-shaded or higher-reflectivity lens). An adaptable imaging unit 122 allows the user to interchange lenses having different properties in the wearable imaging device 100 or a manufacturer to use the same imaging unit 122 in different frame and lens combinations.

The imaging unit 122 may also include a control interface 126, such as a button. The control interface 126 in the example of FIG. 1 is disposed on an exterior surface of the frame 102 proximate to the temple arm 110 (right-side near the imaging unit 122). The control interface 126 may be disposed on an exterior surface of the frame 102 proximate to the temple arm 108 (on left-side near the electronics unit 116). The control interface 126 may be used to provide commands to the imaging unit 122, such as to capture an image, start and/or stop capturing video, or other commands, for example, taking the form of various combinations of presses or taps against the control interface 126. Though the control interface 126 is shown here as a button, other interfaces such as sliders, touch pads, capacitive sensors, heat sensors, etc. may be used to provide commands to the imaging unit 122 and the electronics unit 116.

In some implementations, means other than the control interface 126 may be used to provide commands. For example, commands may be provided to the electronics unit 116 and/or the imaging unit 122 using voice or audio commands when the sensor 118 includes a microphone that detects when the user provides an actionable voice or audio command (e.g., take picture) or a gesture sensor that detects when the user moves a hand or other object across the imaging lens 124 of the imaging unit 122 in a pre-defined manner. In one example where the sensor 118 comprises a microphone, the wearable imaging device 100 may be configured for audio-only capture. In another example where the sensor 118 comprises a gesture sensor, the user may move an arm or a finger within the field-of-view (FOV) of the imaging lens 124 or another area of the wearable sensor device 100 to direct attention toward a subject in order to "focus" the imaging unit 122 on the subject. In another example including the gesture sensor, the user can cover or block the imaging lens 124 to stop and/or start image capture. The wearable imaging device 100 can include multiple sensors including both a microphone and a gesture sensor.

In another example, commands may be provided to the electronics unit 116 and/or the imaging unit 122 using a low-power wireless connection (e.g., BTLE) by a remote device (i.e., remote device control). In one example of remote device control, the user may rely on a remote device such as a tablet, smartphone, or remote controller to send signals to the electronics unit 116 and/or the imaging unit 122 (and/or any other component of the wearable imaging device 100) so as to avoid making obvious gestures, speaking commands, or touching the control interface 126. Control by a remote device may be useful, for example, at a solemn event such as a wedding.

In some implementations, the imaging unit 122 can be clipped or coupled to the user's glasses or sunglasses as a standalone device that can be in communication with an external device (e.g., smartphone) to provide image capture. The imaging unit 122 serving as a standalone device can include various components including but not limited to the electronics unit 116, the sensor 118, and the power source 120, for example, to enable the imaging unit 122 to receive audio commands from the user to start/stop the image capture. In this implementation, the standalone imaging unit 122 would serve as a wearable imaging device that the user can control with an external device such as a smartphone.

In another example, when any of the one or more sensors (including the sensor 118) are configured to capture biometric information from the user, such as in the case of a proximity sensor or a heat sensor, the electronics unit 116 and/or the imaging unit 122 may be configured to stop operation and/or power down the wearable imaging device 100 when the one or more sensors do not receive any biometric information indicative of a nearby presence of the user of the wearable imaging device 100 for a predetermined or threshold time period. Auto-shut down of the wearable imaging device 100 may be desirable to conserve power. The biometric information can also be received to lock/unlock the wearable imaging device 100 and/or start/stop the capturing of images/video (i.e., media).

In addition, the electronics unit 116 and the imaging unit 122 may be configured to stop operation and/or power down the wearable imaging device 100 when the imaging lens 124 of the imaging unit 122 does not receive a sufficient amount of light for a predetermined time period. For example, if the imaging lens 124 does not capture a threshold amount of light over a predefined period of one minute (or two minutes, three minutes, etc.), as would be the case when the wearable imaging device 100 is stored in a storage case, a drawer, or a backpack, the electronics unit 116 and the imaging unit 122 may be configured to power down the wearable imaging device 100 to conserve energy.

The electronics unit 116, the sensor 118, the power source 120, the imaging unit 122, and/or the control interface 126 may be designed with electromagnetic shielding to limit the amount of radiation transmitted. The frame 102, the lenses 104, 106, the temple arms 108, 110, the hinges 112, 114, the electronics unit 116, the sensor 118, the power source 120, the imaging unit 122, and/or the control interface 126 may also be designed to be water resistant and/or waterproof to a specified depth (e.g., 1-5 m) such that the wearable imaging device 100 may be used to capture images and video in wet or moist environments (e.g., underwater). The imaging unit 122 may also be configured to automatically adjust image capture (e.g., apply focus correction) based on the presence of water on the lenses 104, 106 as detected, for example, by the sensor 118.

In some examples, the electronics unit 116 and/or the imaging unit 122 may communicate with a remote device in order to send and/or receive commands, send and/or receiving image information, and/or perform imaging operations. For example, the wearable imaging device 100 can communicate with a remote control device, a smartphone, a tablet, a smart watch, etc. in order to receive commands and/or to interface with camera applications, social media applications, gaming applications, messaging applications, fitness or monitoring applications, settings applications, etc. In one example, a remote control device can provide on/off or stop/start commands.

Figure 2:
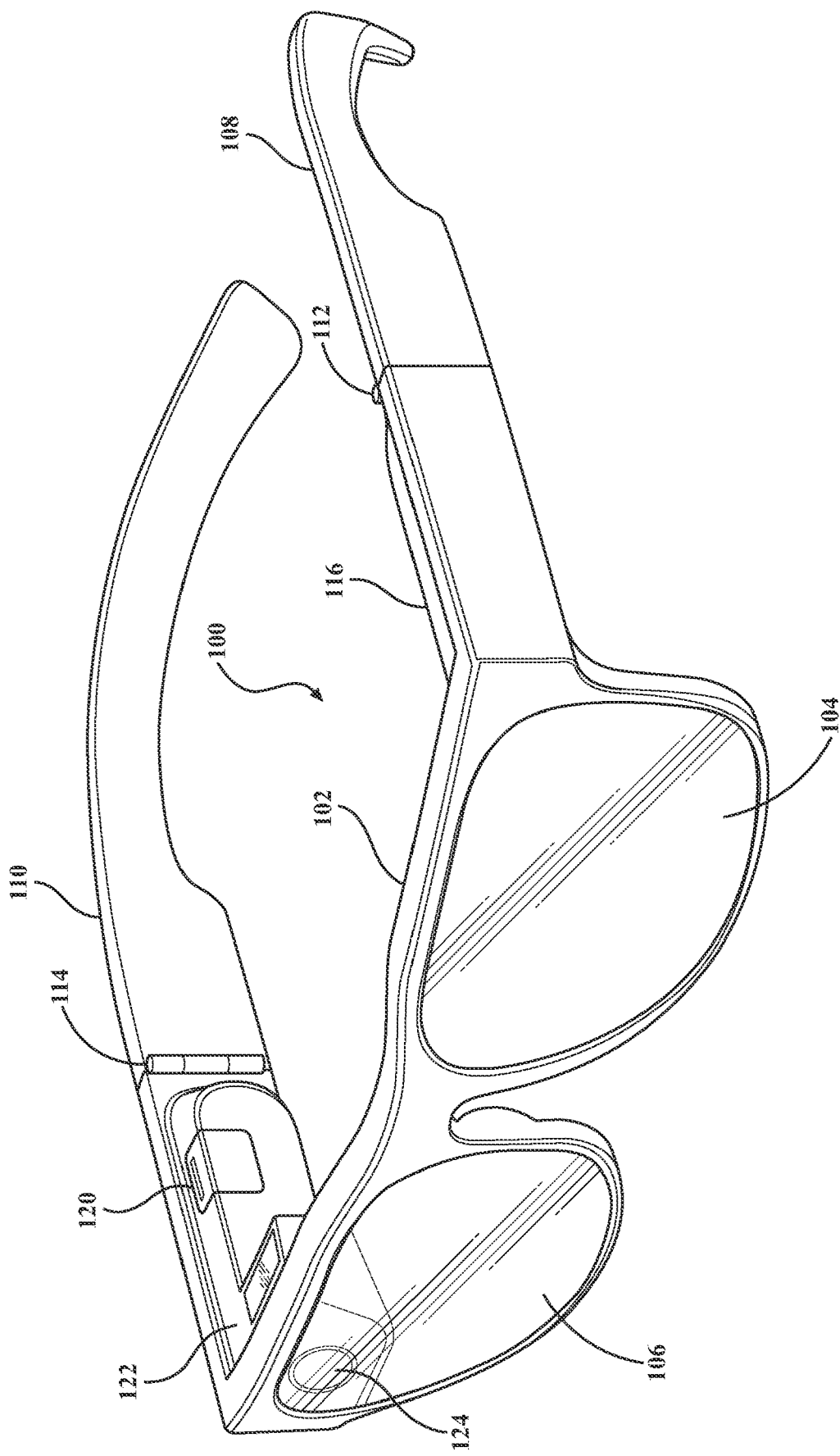
FIG. 2 shows a left-side perspective view of the wearable imaging device of FIG. 1.

FIG. 2 shows a left-side perspective view of the wearable imaging device 100 of FIG. 1. In this view, the imaging lens 124 of the imaging unit 122 is visible behind the lens 106 disposed in the frame 102 of the wearable imaging device 100. The lenses 106, 124 are thus "stacked" in this example such that light passes through the lens 106 before passing through the imaging lens 124. In some implementations, a seal may be formed between the lenses 106, 124 such that debris, water, and/or air cannot freely pass between the lenses 106, 124, keeping the imaging lens 124 isolated from particulates that could impact image quality.

In some implementations, there may be a gap between the lenses 106, 124 such that additional optical elements may be disposed between the lenses 106, 124 and/or such that air and/or water can pass between the lenses 106, 124. In some implementations, additional optical elements within the imaging unit 122 or changes to geometry of the imaging lens 124 may be required to mitigate potential distortion caused by the imaging lens 124 capturing light through the lens 106 disposed in the frame 102. For example, local flattening or curving of an inside surface of the imaging lens 124 (or the lens 106) may be used to improve image quality.

Though shown as positioned behind the lens 106 in a "stacked" manner, the imaging lens 124 may be positioned behind the lens 104, may be housed within the frame 102 so as to be unobstructed by the lenses 104,106, or may be positioned in any other manner in respect to the frame 102 so as to be capable of capturing light from a vantage point of the user. For example, the imaging lens 124 may be positioned within the frame 102 proximate to a bridge portion that is in between the lenses 104, 106. In some implementations, the imaging lens 124 of the imaging unit 122 may be integral with the lens 106 disposed within the frame 102, that is, the lenses 106, 124 may be of unitary construction. In some implementations, the imaging lens 124 may be inset within the lens 106.

Figure 3:
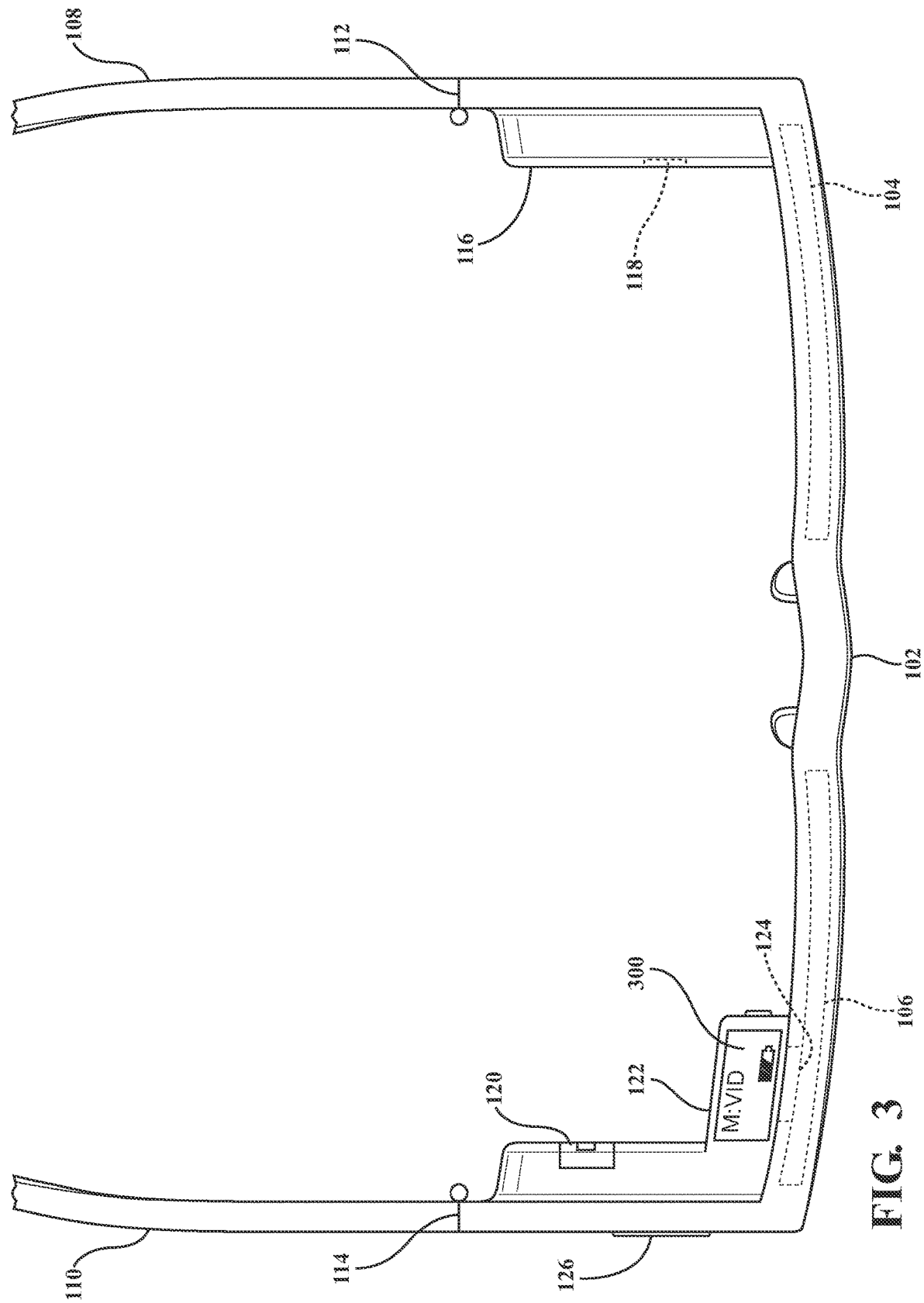
FIG. 3 shows a top view of the wearable imaging device of FIGS. 1 and 2.

FIG. 3 shows a top view of the wearable imaging device 100 of FIGS. 1 and 2. The lenses 104, 106, 124 are shown as partially disposed or embedded within the frame 102 using dotted lines to show an example of boundaries of these components within the frame 102. The control interface 126 is shown as sitting proud of the frame 102 near the temple arm 110 in direct communication with the power source 120 and the imaging unit 122. In one example, the control interface 126 may be inset within the frame 102 and directly accessible to the user. In another example, the control interface 126 may be operable by tactile manipulation of the frame 102.

The wearable imaging device 100 may include a display unit 300. The display unit 300 may be disposed on a top surface of the imaging unit 122, sitting rearward of a front face of the frame 102. The display unit 300 may also be disposed on other surfaces and components of the wearable imaging device 100. For example, the display unit 300 may be embedded within and a portion of either of the lenses 104, 106. In another example, the display unit 300 can be disposed on an exterior surface (i.e., outward-facing) of the frame 102.

The control interface 126 may interact with the display unit 300 in that, for example, the control interface 126 may be used to selectively operate the display unit 300. The display unit 300 may show, for example, a mode indication indicative of the operating mode of the imaging unit 122 on a display screen (e.g., LED, OLED, waveguide technology, etc.). The mode indication may be textual as shown (e.g., M: VID) or otherwise visible or discernable by the user. The mode indication may allow the user to determine a mode of operation (e.g., image resolution, frame rate, capture mode, sensor mode, video mode, photo mode, etc.). The display unit 300 may also show a connection indication (e.g., connected, wireless, wired connection, etc.), a power indication (e.g., standby mode, sensor mode, video mode, battery status, low battery warning, full battery, etc.), information related to social media sources (e.g., number of likes, number of viewers, etc.), information related to metadata sources (e.g., heart rate, GPS, etc.), and/or other information relevant or related to operation of the wearable imaging device 100.

Figure 4:
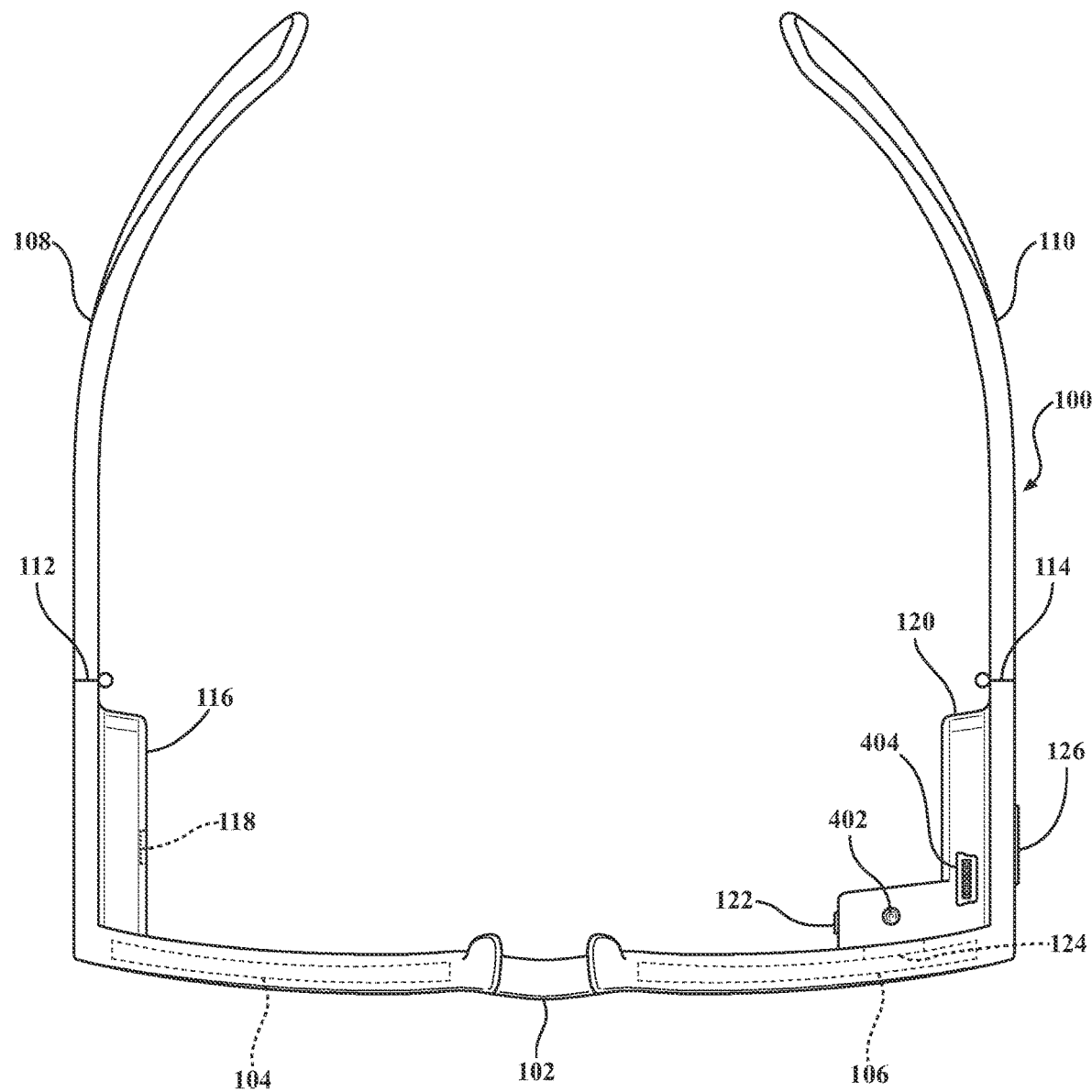
FIG. 4 shows a bottom view of the wearable imaging device of FIGS. 1-3.

FIG. 4 shows a bottom view of the wearable imaging device 100 of FIGS. 1-3. The lenses 104, 106, 124 are shown as partially disposed or embedded within the frame 102 using dotted lines. An indicator 402, for example, in the form of a light-emitting device (e.g., LED) or an audio speaker, is shown as disposed on a bottom surface of the imaging unit 122. The wearable imaging device 100 can include one or more indicators in varying combinations (e.g., the indicator 402 comprising an LED and another indicator comprising an audio speaker). Alternatively, the indicator 402 may be disposed on a top surface of the imaging unit 122, a side surface of the imaging unit 122, a top, bottom, or side surface of the electronics unit 116 and/or the power source 120, or on any surface of the frame 102. Like the display unit 300 of FIG. 3, the indicator 402 of FIG. 4 may be used to provide a mode indication, a power indication, a connection indication, a social indication, or other information relevant to operation of the wearable imaging device 100 to the user and/or to other individuals nearby the user.

In the case where the indicator 402 is a light-emitting device, different colors or different patterns of light may be emitted in order to represent various modes, power states, or connection statuses. In one example, the indicator 402 may blink in a specific color sequence or blink pattern to indicate that image capture has occurred or is ongoing. By positioning the indicator 402 on the bottom surface or the side surface of the imaging unit 122 (or, alternatively, the electronics unit 116), the user may be visually alerted to a status of the wearable imaging device 100 by the indicator 402 while the wearable imaging device 100 is being worn, for example, on a face of the user. In other words, the indicator 402 may be visible within a line of sight of the user. The indicator 402 may also be designed so as to avoid interference with image capture by the imaging unit 122 and/or so as to be visible from a vantage point of another individual nearby the user.

In the case where the indicator 402 is an audio speaker, various patterns of beeps, sounds, or haptic vibratory buzzes may be emitted in order to represent various modes, power states, connection statuses, or other information. Again, the indicator 402 may be located on various surfaces of the components of the wearable imaging device 100 most suitable to provide feedback to the user. For example, the indicator 402 may be configured to emit a quieter series of beeps to indicate stopping and/or starting of image capture and may be located on a bottom surface of the electronics unit 116 so as to be proximate to an ear of the user when the wearable imaging device 100 is perched on the face of the user. In addition to traditional speakers, the indicator 402 can leverage bone conduction to emit various audible alerts/indications.

The wearable imaging device 100 may include an input/output (I/O) module 404. The wearable imaging device 100 may include more than one I/O module of varying types. In the example of FIG. 4, the I/O module 404 is disposed on a bottom surface of the power source 120, though the I/O module 404 may be disposed in other locations, such as on a bottom surface of the electronics unit 116 or the imaging unit 122 or such as on an exterior surface of the frame 102. The I/O module 404 may include a wired and/or wireless communications interface (e.g., WiFi, Bluetooth, USB, HDMI, Wireless USB, and/or other interfaces) configured to communicate to one or more external devices (e.g., paired with the user's smartphone). The communications interface can also be referred to as a communications unit. In some implementations, the wearable imaging device 100 includes both the I/O module 404 and the communications interface. In other implementations, the wearable imaging device 100 only includes either the I/O module 404 or the communications interface.

The communications interface can include a pairing mechanism that automatically pairs one or more external devices to the wearable imaging device 100. In an implementation, the pairing mechanism pairs the wearable imaging device 100 to the one or more external devices using an image, that is associated with the one or more external devices, for example, that is viewed and/or captured by the imaging unit 122 of the wearable imaging device 100. For example, a user of the wearable imaging device 100 can focus the field-of-view (FOV) of the wearable imaging device, via the imaging unit 122 and corresponding imaging lens 124, on an external device such as the user's smartphone resulting in the wearable imaging device 100 being automatically paired with the user's smartphone.

In some implementations, the pairing mechanism can include a variety of parameters that can either be predetermined (e.g., default settings) or manually selected by the user. The parameters can include but are not limited to requiring a certain amount of time to lapse when the FOV of the wearable imaging device 100 is focused on the external device for the pairing to occur (e.g., the user must focus at least 5 seconds on the external device), being activated only in response to a certain audio, visual, and/or gesture command (e.g., the user saying the phrase "auto-pair using image capture" to enable the wearable imaging device 100 to be paired with the external device), or being activated in response to the submission of a uniquely generated pairing code or pin. Therefore, the pairing mechanism includes a variety of pin-less options in addition to requiring a code or pin to conduct the pairing. The pairing mechanism can be computer-vision-based to enable the user to seamlessly pair the wearable imaging device 100 with an external device such as a laptop or smartphone. The pairing mechanism can utilize machine learning techniques (e.g., using neural networks) to determine various aspects (e.g., shape, color, size, etc.) of the external device over time to speed up the pairing process. The pairing mechanism can also utilize other types of information in addition to images or visual cues to streamline the pairing process including but not limited to QR codes, other types of codes, NFC related information, near-ultrasonic audio information, and ultrasonic pulse information.

The I/O module 404 may also include a wired and/or wireless power interface to an external energy source (e.g., a battery, a DC electrical source, and/or other energy sources) that supplies charge to the power source 120. In some implementations, the I/O module 404 can provide wireless charging (i.e., inductive charging) when placed in contact with a corresponding charging device (e.g., a case of the wearable imaging device 100 could provide wireless charging when the wearable imaging device 100 is placed within the case).

In the example of FIG. 4, the I/O module 404 may include a power interface that is accessible during use of the wearable imaging device 100 in the wearable position such that the user is not required to stop use or remove the wearable imaging device 100 in order to provide charge to the power source 120. For example, a user may wear the wearable imaging device 100 and connect, through the I/O module 404, using a small, flexible power wire, an auxiliary battery or charging unit (not shown) stored in the user's pocket such that the wearable imaging device 100 remains charged for an extended period of time (e.g., for three or four hours, for an entire 24 hour day cycle, etc.).

Figure 5:
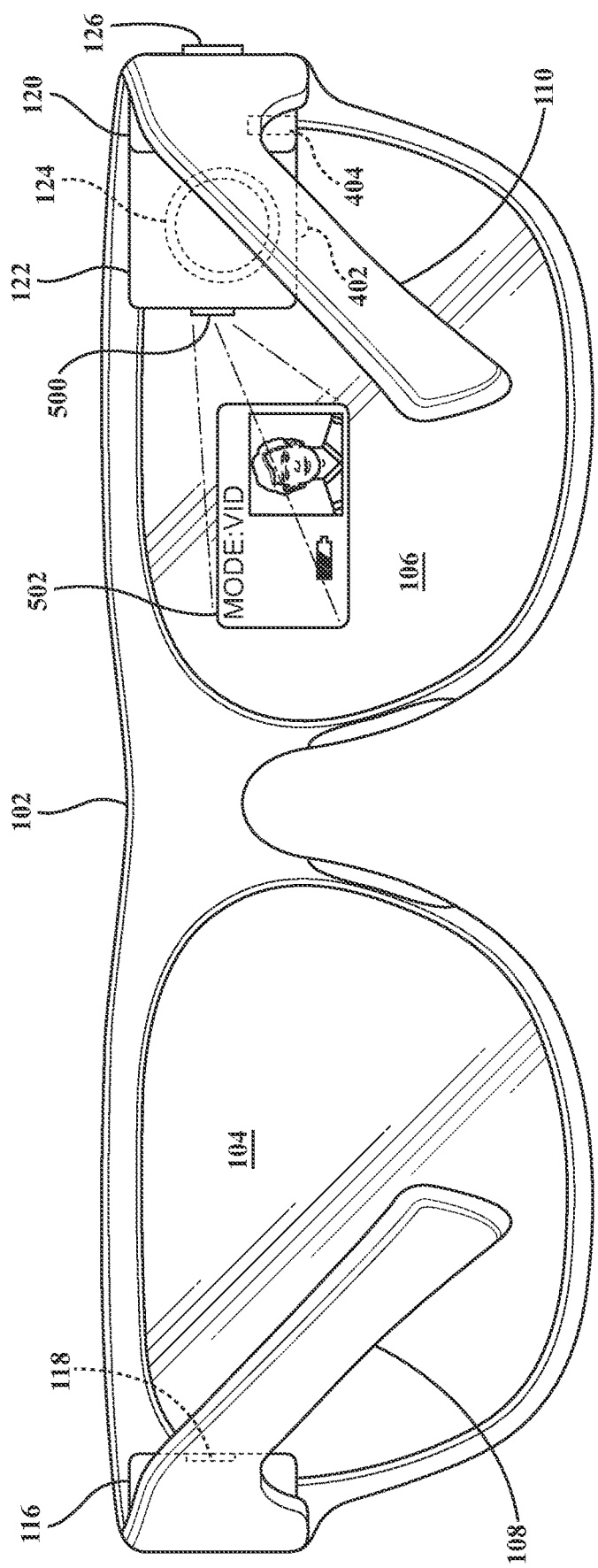
FIG. 5 shows a rear view of the wearable imaging device of FIGS. 1-4.

FIG. 5 shows a rear view of the wearable imaging device 100 of FIGS. 1-4. The sensor 118 is shown as housed within the electronics unit 116, the indicator 402 is shown on a bottom surface of the imaging unit 122, and the I/O module 404 is shown as housed below the power source 120, all using dotted lines. A footprint of the imaging lens 124 is shown at the front of the imaging unit 122 using dotted lines. The control interface 126 is shown as proud of the right side of the frame 102 forward of the temple arm 110, though other locations and/or a flush mount to the frame 102 are also possible.

The wearable imaging device 100 of FIG. 5 includes a display unit 500 disposed at least partially on an inner side of the imaging unit 122. In this example, the display unit 500 can include projection capabilities that allow projection of a display footprint 502, for example, onto an interior of the lens 106 in a line of sight of the user of the wearable imaging device 100. The display footprint 502 may include visually-discernable textual or graphical mode indication information that allows the user to determine a mode of operation (e.g., image resolution, frame rate, capture mode, sensor mode, video mode, photo mode, record/idle, etc.), a connection status (e.g., connected, wireless, wired connection, etc.), a power mode (e.g., standby mode, sensor mode, video mode, battery status, low battery warning, full battery, etc.), information related to social media sources (e.g., number of likes, number of viewers, etc.), information related to metadata sources (e.g., heart rate, GPS, etc.), and/or other information relevant to the user or to operation of the wearable imaging device 100. The display unit 500 can include a variety of technologies including but not limited to LED, OLED, and waveguide technology.

The control interface 126 may be used to selectively operate the display unit 500 to project the display footprint 502, though the display unit 500 may also be configured to project the display footprint 502 automatically, for example, during a change in mode of operation. In another example, when the sensor 118 is a microphone, the display unit 500 may also be configured to project the display footprint 502 based on received voice or audio commands. Though shown at a top-center location on the interior of the lens 106, the display footprint 502 may be alternatively positioned at various locations on the lens 106 to be generally unobtrusive to the user. In some implementations, the imaging unit 122 is located proximate to the lens 104 (e.g., combined with the electronics unit 116 into a single component), and the display unit 500 can project the display footprint 502 onto the lens 104. The location of the indicator 402 and the display unit 500 may also be swapped from the locations shown, that is, switched between the side surface and the bottom surface of the imaging unit 122. In another example, the indicator 402 and/or the display unit 500 may be incorporated within the electronics unit 116 or other components of the wearable imaging device 100 instead of with the imaging unit 122 or the power source 120.

Figure 6:
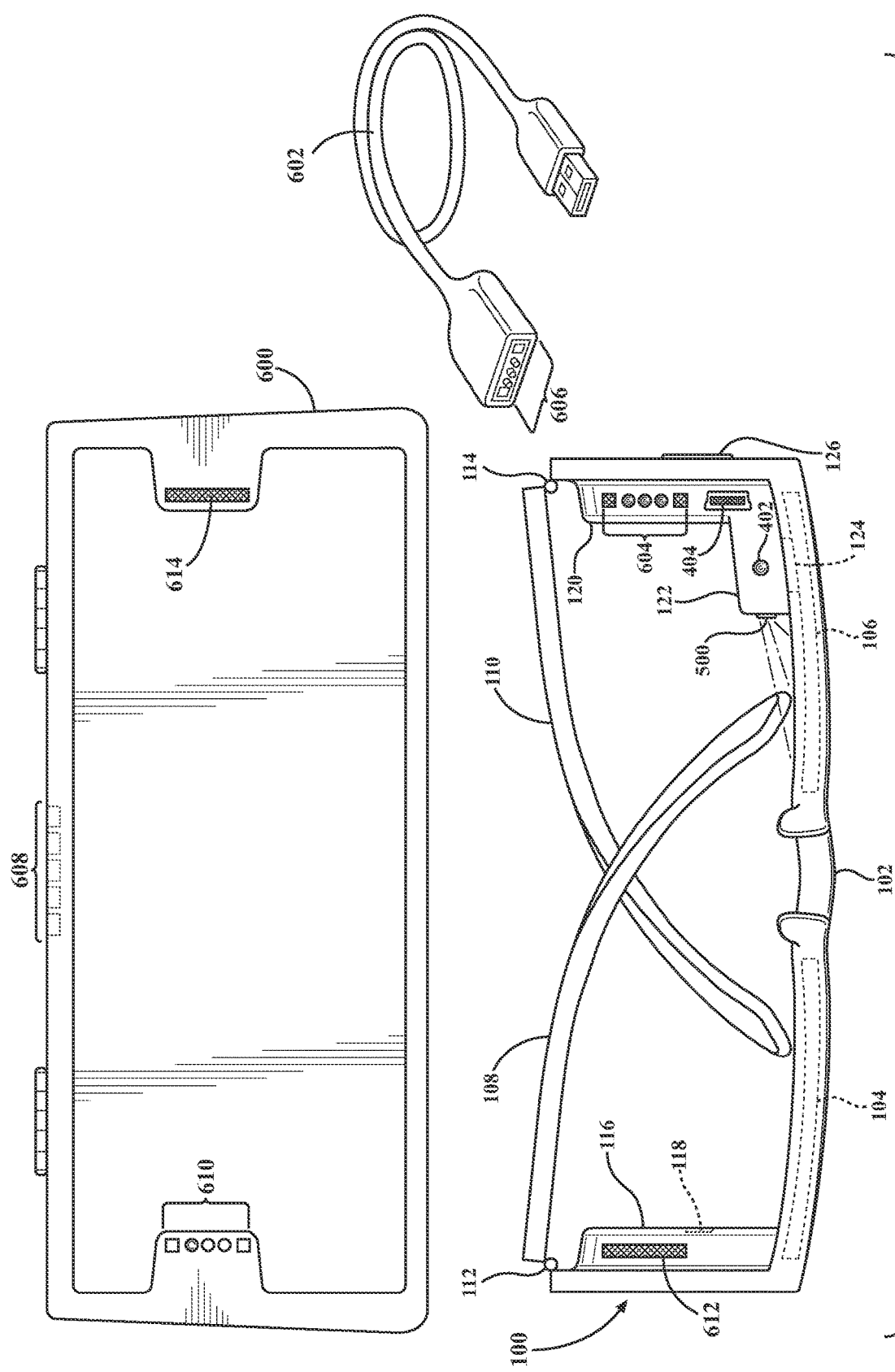
FIG. 6 shows a system view including the wearable imaging device of FIGS. 1-5, a storage case, and an external charging device.

FIG. 6 shows a system view including the wearable imaging device 100 of FIGS. 1-5, a storage case 600, and an external charging device 602. As in prior examples, the lenses 104, 106 of the wearable imaging device 100 are shown as partially disposed or embedded within the frame 102 using dotted lines. The indicator 402, the I/O module 404, and the display unit 500 are shown as disposed on the bottom surface and the side surface of the imaging unit 122, respectively. The external charging device 602 can be plugged into a power source using a variety of connectors including but not limited to a USB connector. The storage case 600 can be any of waterproof, dust proof, radiation proof, and any combination thereof.

The wearable imaging device 100 is shown using a bottom view in a folded position. In the folded position, the temple arms 108, 110 are rotated at the hinges 112, 114 toward a center portion of the frame 102. The temple arms 108, 110, may be positioned in respect to the electronics unit 116, the power source 120, and the imaging unit 122 such that movement between the wearable position and the folded position does not allow the temple arms 108, 110 to impact operation of the wearable imaging device 100. That is, the hinges 112, 114 may be positioned such that folding the temple arms 108, 110 inward toward the frame 102 does not change operation of the electronics unit 116, the power source 120, or the imaging unit 122 and/or does not cause contact between the temple arms 108, 110 and the electronics unit 116, the power source 120, or the imaging unit 122.

The folded position is suitable for storage of the wearable imaging device 100, for example, within the storage case 600, and/or hanging from a shirt collar or a jacket pocket (e.g., in a hooked manner). In a case where the user hangs the wearable imaging device 100 from a shirt collar, the sensor 118 may be configured to determine that the wearable imaging device 100 is in the folded position and in a vertical orientation, for example, when the sensor 118 (or one of the one or more sensors) includes an accelerometer. Subsequently, the sensor 118 may send information to the imaging unit 122 (e.g., through the electronics unit 116) to modify image capture to account for a change in orientation (i.e., a change between determined orientations) of the imaging unit 122 and/or the wearable imaging device 100.

In another example, the sensor 118 (or any other sensor of the wearable imaging device 100) may be configured to determine that the wearable imaging device 100 is in a folded position and that the imaging lens 124 is not receiving any light, for example, for a predetermined period of time. Subsequently, the sensor 118 may send an indication to implement a stand-by mode or to shut off the wearable imaging device 100 due to, for example, lack of movement or storage within a dark space such as a backpack or the storage case 600. In another example, the electronics unit 116 or the imaging unit 122 may be configured to determine specific activity patterns of the user, such as running, skiing, surfing, etc. based on inputs from the sensor 118, and automatically start or stop image capture based on the pattern identified (i.e., an auto-capture feature of either the electronics unit 116 or the imaging unit 122). The determination of specific activity patterns can utilize machine learning algorithms or other similar algorithms that analyze both the content being captured and information associated with the wearable imaging device 100 (e.g., amount of light, user movement, etc.) to determine the specific activity patterns.

The auto-capture feature can automatically detect key moments and enable the user of the wearable imaging device 100 to automatically start and stop image/video capture without having to provide an intervening activity (e.g., selection of a control interface such as the control interface 126 comprising a button, providing an audio command, etc.). This enables the user to engage in the activity (e.g., surfing) without having to worry about starting and/or stopping image capture to fully immerse within the activity. The auto-capture feature can also specifically tailor content that is captured for use on various social media platforms. For example, if the wearable imaging device 100 detects that the user often or always uploads videos to a certain social media platform that requires a specific video format with a maximum time length, the wearable imaging device 100 can generate or capture the content in the specific video format and within the maximum time length. The content can then be automatically uploaded by the wearable imaging device 100 to the social media platform. The user is thus only required to use the wearable imaging device 100, and the wearable imaging device 100 automatically generates and posts the tailored content based on historical use. The auto-capture feature can enable the wearable imaging device 100 to first determine valuable content (i.e., content valuable to the user) before encoding and capturing the content which enhances battery life, storage space, and processing capabilities of the wearable imaging device 100.

The wearable imaging device 100 in FIG. 6 may include an I/O module 604 in addition to the I/O module 404. Here, the I/O module 604 includes a data and power interface formed of several electronic contacts and/or pogo pin receptors disposed on the imaging unit 122 suitable to couple complementary electronic contacts and/or pogo pins serving as an I/O module 606 disposed on the external charging device 602. Thus, the I/O module 606 of the external charging device 602 may be set adjacent to, press fit, and/or otherwise coupled to the I/O module 604 so as to use the external charging device 602 to charge the power source 120 of the wearable imaging device 100. Though shown as including electronic contact locations and/or pogo pins, the I/O modules 604, 606 may take other forms suitable, for example, for wired coupling of the external charging device 602 to the wearable imaging device 100.

The storage case 600 may be used for storage and/or protection of the wearable imaging device 100, as an interface between the wearable imaging device 100 and the external charging device 602, and as an additional source for power and/or image storage/memory for the wearable imaging device 100. In one example, the I/O module 606 of the external charging device 602 may be coupled to an I/O module 608 disposed on the storage case 600. In turn, the I/O module 604 of the wearable imaging device 100 may be coupled to another I/O module 610 disposed on the storage case 600, linking the external charging device 602, the storage case 600, and the wearable imaging device 100 through the various I/O modules 604, 606, 608, 610. The I/O module 604 of the wearable imaging device 100 may also be coupled to the I/O module 610 disposed on the storage case 600 in absence of the external charging device 602, allowing transfer of stored charge from the storage case 600 to the wearable imaging device 100 and/or transfer of data from the wearable imaging device 100 to the storage case 600 or to another external device (e.g., smartphone, cloud storage system, etc.) in communication with the storage case 600. To better align the wearable imaging device 100 and the storage case 600 for charging and/or data transfer purposes, the wearable imaging device 100 and the storage case 600 may include respective positioning mechanisms 612, 614, such as magnets, male/female mechanical tab/slots, etc.

For example, when the wearable imaging device 100 is stored in the folded position within the storage case 600, electronic contacts and/or pogo pin receptors of the I/O module 604 can be put in direct contact with electronic contacts and/or pogo pins of the I/O module 610 in order transfer power and/or data. At the same time, the positioning mechanism 612 of the wearable imaging device 100 may be engaged to the positioning mechanism 614 of the storage case 600 for retention purposes. In another example, the I/O modules 604, 610 may not be required, as the storage case 600 may be configured to provide inductive, microwave, or radio-frequency charging to the power source 120 on the wearable imaging device 100 irrespective of the orientation of the wearable imaging device 100 within the storage case 600. In this example, the storage case 600 may be connected to the external charging device 602 to enable charging of the wearable imaging device 100.

Figure 7:
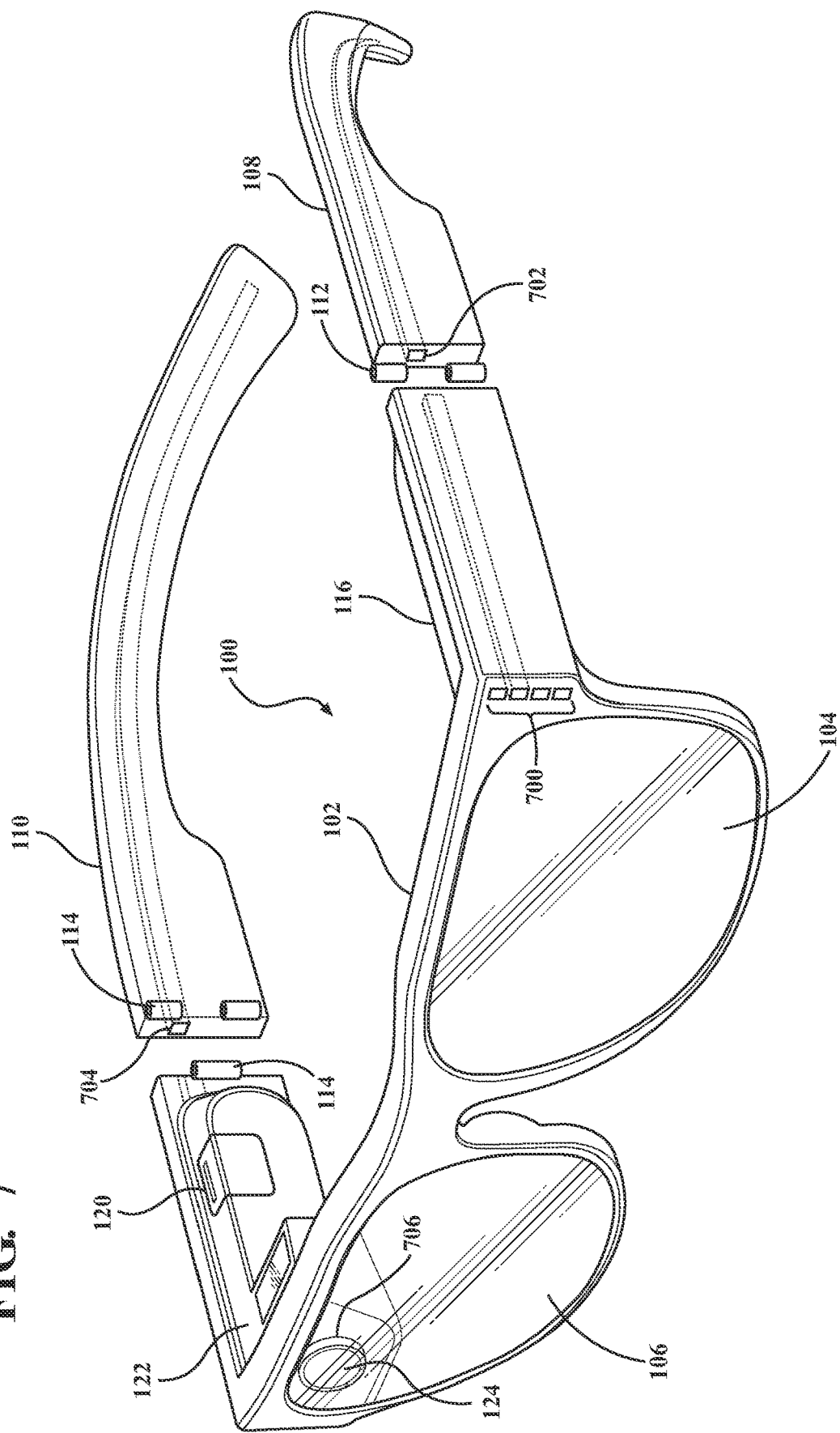
FIG. 7 shows a partially exploded left-side perspective view of the wearable imaging device of FIGS. 1-6.

FIG. 7 shows a partially-exploded left-side perspective view of the wearable imaging device 100 of FIGS. 1-6. The lenses 104, 106 are shown as disposed within the frame 102, the temple arms 108, 110 and the hinges 112, 114 are shown in an open position, and the electronics unit 116, the power source 120, and the imaging unit 122 are shown as disposed on an interior of the frame 102. Some components within the electronics unit 116, the power source 120, and the imaging unit 122 may generate heat during operation and/or image capture. Dissipating this heat to maintain acceptable operating temperatures, for example, under 40° C., can be important to both user comfort and successful, continued operation of the wearable imaging device 100.

A heat sink feature 700 is shown as disposed on (and/or extending from) a front surface of the frame 102 adjacent the lens 104. In this example, the heat sink feature 700 is shaped to appear as a design feature, such as a logo, and may be formed of flush or raised elements of a conductive material, such as metal or composite. The heat sink feature 700 is at least partially exposed to air (or water) based on its location on a front surface of the frame 102, encouraging heat dissipation.

The wearable imaging device 100 may also include heat sink wires 702, 704 embedded within interiors of and extending along sides of the frame 102 and the temple arms 108, 110 respectively. The heat sink wires 702, 704 may be formed of conductive material, such as metal or composite. In one example, the heat sink wire 702 is in physical contact with a portion of the heat sink feature 700. The heat sink wire 702 extends from the heat sink feature 700 along an interior of a side of the frame 102 and along an interior of the temple arm 108 to an end of the temple arm 108. The heat sink wire 702 may be in thermal communication with the electronics unit 116 such that the heat sink wire 702 carries heat generated by the electronics unit 116 both forward to the heat sink feature 700 and rearward toward the end of the temple arm 108. An operating temperature of the electronics unit 116 can thus be controlled using heat dissipation through the mechanisms of the heat sink feature 700 and the heat sink wire 702.

The heat sink wire 704 may similarly extend from and be in thermal communication with the imaging unit 122. The heat sink wire 702 may extend along an interior of another side of the frame 102 and along an interior of the temple arm 110 to an end of the temple arm 110. Thus, the heat sink wire 704 carries heat generated by the imaging unit 122 rearward toward the end of the temple arm 110. Though not shown, another heat sink feature may be present adjacent to the lens 106 and function in a manner similar to the heat sink feature 700, carrying heat forward, for example, from the imaging unit 122 to a front surface of the frame 102 for dissipation. The heat sink wires 702, 704 may also act as shaping wires, that is, wires that are used to better fit the wearable imaging device 100 to a contour of a user's face and head, for example, using heating and bending to set a position of the heat sink wires 702, 704 within the sides of the frame 102 and the temple arms 108, 110.

As shown by the partially exploded view of the temple arms 108, 110, the heat sink wires 702, 704 are positioned centrally within interiors of the respective temple arms 108, 110 in order to keep exterior surfaces of the wearable imaging device 100 at cooler temperatures. That is, the material forming the frame 102 and the temple arms 108, 110, for example, plastic or polymer, can act as an insulator while heat travels along the heat sink wires 702, 704. Since the heat sink wires 702, 704 must cross small gaps between the frame 102 and the temple arms 108, 110 at a location of the hinges 112, 114, the heat sink wires 702, 704 may be designed with a touch-based interface, such as a spring, flex-spring, brush-spring, or other interlocking interface (not shown), to ensure that heat is carried across the small gaps. Further, though only two heat sink wires 702, 704 are shown, each side of the frame 102 and each temple arm 108, 110 may include multiple heat sink wires used to further dissipate heat from the electronics unit 116, the power source 120, and the imaging unit 122.

In another example of heat dissipation for the wearable imaging device 100 shown in FIG. 7, the imaging unit 122 can be spaced apart from the lens 106, with an open gap or space present between an inner surface of the lens 106 and an outer surface of the imaging unit 122. The imaging lens 124 can extend forward from the imaging unit 122 across the open gap or space as shown. A heat sink feature 706, such as a bezel, may be designed to surround the extending portion of the imaging lens 124. The heat sink feature 706 may be exposed, for example, to air passing through the gap between the surfaces of the lens 106 and the imaging unit 122. The heat sink feature 706 may be formed of a material, such as metal or composite, sufficient to carry heat away from imaging components within the imaging unit 122 to dissipate heat.

If the heat sink features 700, 706 and/or the heat sink wires 702, 704 fail to maintain operating temperatures of the imaging unit 122 below a predetermined threshold, such as 40° C., for a predetermined period of time, such as one minute, the imaging unit 122 may be programmed to limit image capture. For example, image resolution may be limited, a time period for image capture may be limited, a frame rate may be limited, and/or a shut-off feature for the wearable imaging device 100 may be implemented in order to bring temperatures of the imaging unit 122 below a desired or predetermined threshold.

Figure 8:
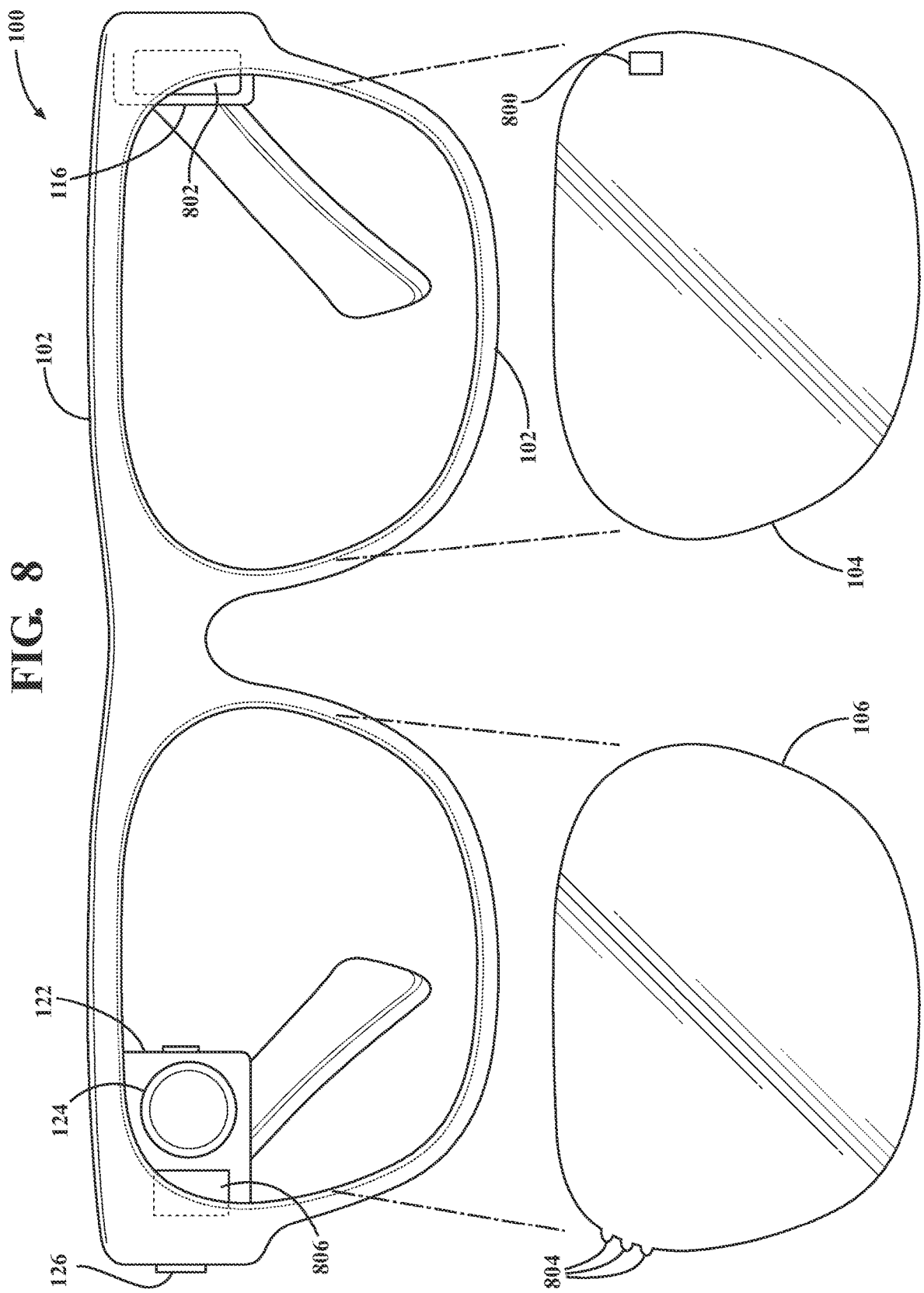
FIG. 8 shows a partially exploded front view of the wearable imaging device of FIGS. 1-7.

FIG. 8 shows a partially exploded front view of the wearable imaging device of FIGS. 1-7. In this example, the lenses 104, 106 are removable and/or replaceable and are shown as removed from the frame 102. With the lenses 104, 106 removed, front surfaces of the electronics unit 116, the imaging unit 122, and the imaging lens 124 are visible within the openings through the front surface of the frame 102. When the lenses 104, 106 are removable and/or replaceable, the user can choose to customize the wearable imaging device 100, for example, by selecting and installing other lenses (not shown) with different tints, prescriptions, or polarization. The user can also use the wearable imaging device 100 without the lenses 104, 106.

The lenses 104, 106 may include various mechanisms for coupling with and/or decoupling from the frame 102. For example, the lenses 104, 106 can be snap-fit, magnetically joined, press-fit, or otherwise keyed into the appropriate openings within the frame 102. The lenses 104, 106 may also include features suitable for recognition by the electronics unit 116 and/or the imaging unit 122 in order to allow firmware updates to the imaging unit 122 consistent, for example, with the tint level of the lenses 104, 106 being used with the wearable imaging device 100.

In one example, the lens 104 may include an electronic tag 800, such as an RFID tag, and the electronics unit 116 may include a complementary tag reader 802 that is aligned to the electronic tag 800 when the lens 104 is fit into the appropriate opening within the frame 102. Provisions for reading the electronic tag 800 may alternatively be provided through use of the sensor 118 (not shown). Once the electronic tag 800 is recognized, in this example, by the tag reader 802, firmware in the imaging unit 122 may be tuned to match the specific physical features (such as tint, prescription, reflectivity, shape, etc.) of the installed lens 104. In another example, the lens 106 may include a key 804 with a particular pattern that is used to interface with an electro-mechanical switch 806 disposed on the imaging unit 122. Here, the key 804 includes a series of spaced nubs or extensions that may fit against the electro-mechanical switch 806 when the lens 106 is installed. Depending on the pattern associated with the key 804, the electro-mechanical switch 806 may send an indication to the imaging unit 122 that the lens 106 has specific physical features (such as tint, prescription, reflectivity, shape, etc.). The imaging unit 122 then adjusts firmware to perform image capture (i.e., optimized image capture corresponding to the specific physical features) based on the pattern associated with the key 804.

In another example (not shown), the lenses 104, 106 may not include identification features directly recognizable by sensors or switches associated with the electronics unit 116 or the imaging unit 122 or other components of the wearable imaging device 100. Instead, tuning of firmware associated with the imaging unit 122 may occur based on analysis of an image captured through the lenses 104, 106. The analysis of the image may indicate, for example, that white-balance or light attenuation are not within acceptable ranges, and the imaging unit 122 may then automatically tune firmware to correct these values. Automatic tuning of firmware may be useful in cases where the lenses 104, 106 are not present or when the lenses 104, 106 automatically adjust themselves to changes in lighting conditions thereby enabling the lenses 104, 106 to interchange between varying physical features at varying moments.

FIGS. 9A, 9B, 9C show partial top views of the wearable imaging device 100 of FIGS. 1-8. The lens 106 is shown as disposed within the frame 102, the temple arm 110 and the hinge 114 are shown in an open position, and the power source 120 and the imaging unit 122 are shown as disposed on an interior of the frame 102. The control interface 126 is shown as disposed on an exterior of the frame 102. Various embodiments of the lens 106 are shown in each of the FIGS. 9A, 9B, 9C to detail potential configurations as related to the imaging lens 124. The potential configurations may allow for improved image capture by the imaging unit 122 depending on environmental conditions during operation of the wearable imaging device 100.

In FIG. 9A, the imaging unit 122 is spaced apart from the lens 106, with an open gap or space present between an inner surface of the lens 106 and an outer surface of the imaging unit 122. The imaging lens 124 may protrude from the imaging unit 122 and include a curved portion or cover for improved image quality that extends forward from the imaging unit 122 within the open gap or space as shown. Using a gap or space between the outer surface of the imaging unit 122 and the inner surface of the lens 106 avoids any changes in shape to the lens 106 to achieve high quality image capture, though air or water are able to reach the imaging lens 124 without separate sealing accommodations.

In FIG. 9B, portions of the imaging unit 122 and/or the imaging lens 124 may be designed to be flush or sealed against portions of the frame 102 and/or the lens 106 in order to seal the imaging lens 124 from air, water, debris, or other forces of an outside environment. In order to achieve a curved or contoured shape for the portion of the imaging lens 124 extending from the imaging unit 122 in this scenario, the lens 106 may include another curved, contoured, bulged, or rounded shape that receives the curved, contoured, or rounded shape of the imaging lens 124 as shown in this top view.

In FIG. 9C, a contoured, curved, bulged, or rounded portion of the imaging lens 124 may be sealed against air, water, debris, or other forces of an outside environment by use of a lens housing 900. The lens 106 may include a cutout to accommodate the lens housing 900, or the lens housing 900 may be formed as part of the lens 106. The lens housing 900 may have a flat outer surface in order to preserve sharpness in images captured by the imaging unit 122 underwater. The lens housing 900 serves to keep water from negatively impacting image capture using the imaging lens 124, as water may act as another lens without interruption by the flat surface of the lens housing 900, distorting image capture.

In some examples (not shown) of the wearable imaging device 100 of FIGS. 1-9C, at least some of the imaging components may be produced independently (or as a singular unit) and later joined, for example, using snap-fit, press-fit, adhesion, and/or other connection methods, to the frame 102. This allows the user to both customize and interchange frames and lenses when desired. In another example, the frame may be designed to include, for example, the power source 120 and the control interface 126, and the electronics unit 116, and the imaging unit 122 may be selectively joined and/or disconnected. A modular design of at least some of the imaging components of the wearable imaging device 100 will allow different designers and/or manufacturers to design different frames (and/or lenses) to support the imaging components. In another example, the electronics unit 116, the sensor 118, the power source 120, the imaging unit 122, the control interface 126, the indicator 402, and other components can be combined into a singular device that can be coupled or attached to an existing pair of glasses or sunglasses.

The interfaces between the native and the interchangeable or modular components of the wearable imaging device 100 may be designed to provide adequate sealing (e.g., maintain waterproof status, avoid dust and/or debris intrusion, etc.). The use of modular components also allows for ease of service or replacement of specified components without the need to service the entire wearable imaging device 100.

The wearable imaging device 100 of FIGS. 1-9C is described as having the electronics unit 116, the sensor 118, the power source 120, the imaging unit 122, the control interface 126, the indicator 402, and the various I/O modules 404, 604 as disposed partially within the frame 102 or disposed on components extending from the frame 102. In some implementations, at least some of these components may be housed entirely within the frame 102 and/or effectively hidden from view of both the user and individuals nearby the user. For example, the indicator 402 may not visible until lit, the control interface 126 may be a capacitive switch (vs. a button), the imaging lens 124 may be hidden within the frame 102 by a digital pane that becomes transparent only when image capture occurs, etc. By masking or hiding various components, the wearable imaging device 100 may be used both as an image capture device and as an unobtrusive fashion accessory (e.g., a pair of sunglasses).

Figure 10:
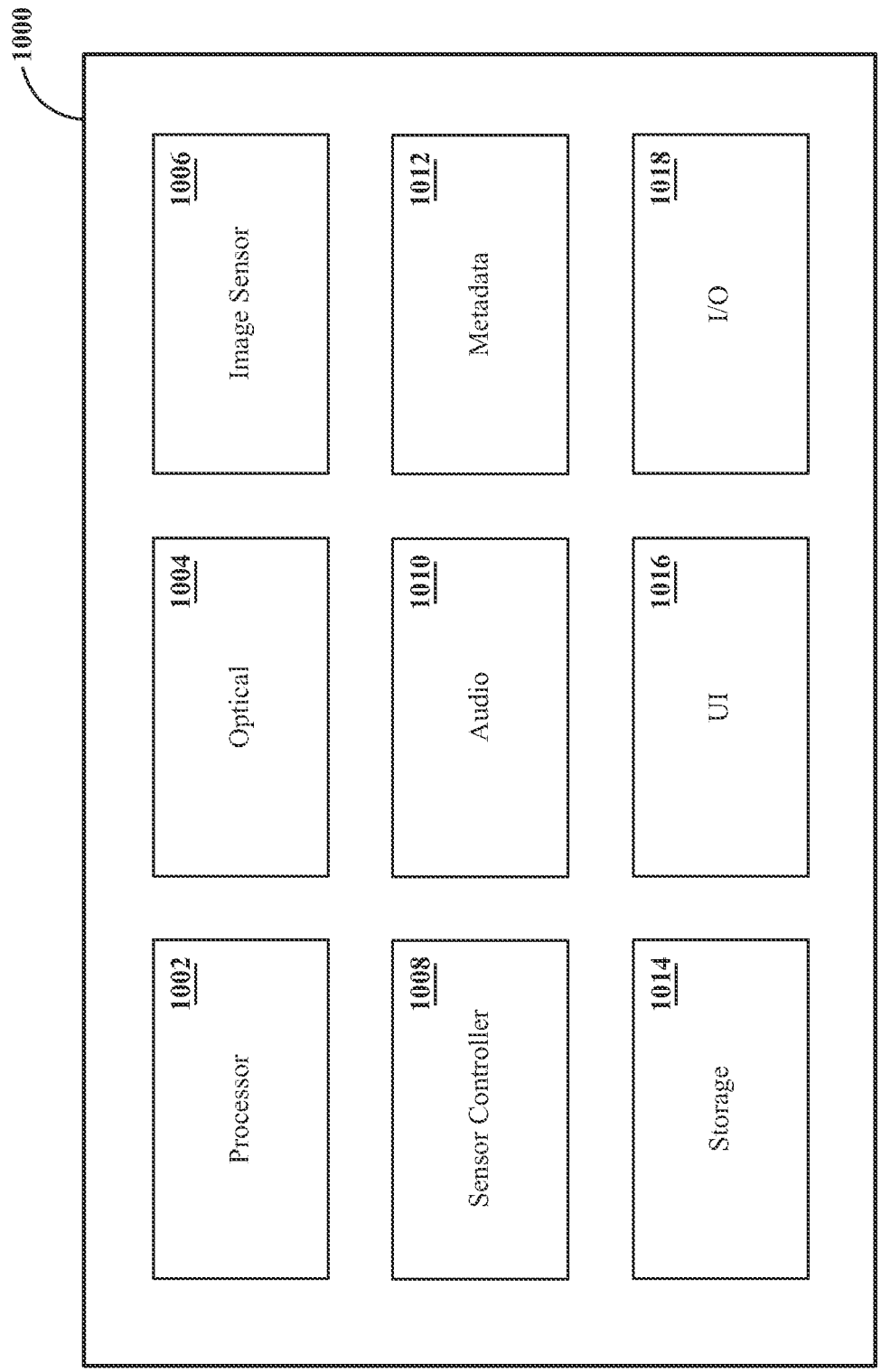
FIG. 10 is a functional block diagram illustrating electronic components of an imaging device.

FIG. 10 is a functional block diagram illustrating electronic components of an imaging device 1000. The imaging device 1000 of FIG. 10 may include a camera (i.e., an imaging device) configured to capture photo, video, and/or audio content. The imaging device 1000 can comprise a variety of devices including but not limited to the wearable imaging device 100 of FIGS. 1-9C. In some implementations, the imaging device 1000 represents a standalone device comprising the imaging unit 122 of the wearable imaging device 100 that can be removably coupled to various wearable devices (e.g., glasses, sunglasses, etc.). The imaging device 1000 may include one or more processors 1002 (such as a system on a chip (SOC), microcontroller, microprocessor, CPU, DSP, ASIC, GPU, and/or other processors) that control the operation and functionality of the imaging device 1000.

The imaging device 1000 may include one or more optical elements 1004, such as one or more lenses (e.g., the lenses 104, 106 and the imaging lens 124 of the wearable imaging device 100). The one or more lenses may include, by way of non-limiting example, one or more of a standard lens, macro lens, zoom lens, special-purpose lens, telephoto lens, prime lens, achromatic lens, apochromatic lens, process lens, wide-angle lens, ultra-wide-angle lens, fisheye lens, infrared lens, ultraviolet lens, perspective control lens, other lens, and/or other optical element. In some implementations, the optical elements 1004 may implement focus controller functionality configured to control the operation and configuration of the one or more lenses.

The imaging device 1000 may include an image sensor 1006 (e.g., an image sensor of the imaging unit 122 or one of the one or more sensors of the wearable imaging device 100), such as one or more of a charge-coupled device (CCD) sensor, active pixel sensor (APS), complementary metal-oxide semiconductor (CMOS) sensor, N-type metal-oxide-semiconductor (NMOS) sensor, and/or other image sensor. The imaging device 1000 may include one or more image sensors. The image sensor 1006 may be configured to capture light waves gathered by the optical elements 1004 and to produce image data based on control signals from a sensor controller 1008 (e.g., a controller of the imaging unit 122). The image sensor 1006 may be configured to generate a first output signal conveying first visual information regarding the object. The visual information may include one or more of an image, a video, and/or other visual information. In some implementations, the image sensor 1006 may include, without limitation, video, audio, capacitive, radio, vibrational, ultrasonic, infrared, radar, LIDAR and/or sonar, and/or other sensory devices. The optical elements 1004 and the image sensor 1006 may be embodied in a housing.

The imaging device 1000 may include the aforementioned sensor controller 1008. The sensor controller 1008 may be used to operate the image sensor 1006. The sensor controller 1008 may receive image or video input from the image sensor 1006 and audio information from one or more audio components 1010 (e.g., the sensor 118 comprising a microphone), such as from microphones configured to provide audio information that may be associated with images being acquired by the image sensor 1006 or voice-based commands being provided by the user. In some implementations, audio information may be encoded using, e.g., AAC, AC3, MP3, linear PCM, MPEG-H, and/or other audio coding formats (audio codec). In one or more implementations of spherical video and/or audio, the audio codec may include a 3-dimensional audio codec.

The imaging device 1000 may include one or more metadata sources 1012 embodied within a housing and/or disposed externally to the imaging device 1000. The processor 1002 may interface to the sensor controller 1008 and/or the one or more metadata sources 1012. The metadata sources 1012 may include sensors such as an inertial measurement unit (IMU) including one or more accelerometers and/or gyroscopes, a magnetometer, a compass, a global positioning system (GPS) sensor, an altimeter, an ambient light sensor, a temperature sensor, a pressure sensor, a heart rate sensor, and/or other sensors. The imaging device 1000 may contain one or more other metadata/telemetry sources, e.g., a battery monitor, storage parameters, and/or other information related to camera operation and/or capture of content. The metadata sources 1012 may obtain information related to an environment of the imaging device 1000 and aspects in which the content is captured.

By way of a non-limiting example, the accelerometer may provide device motion information comprising velocity and/or acceleration vectors representative of motion of the imaging device 1000; the gyroscope may provide orientation information describing the orientation of the imaging device 1000; the GPS sensor may provide GPS coordinates, time, and identifying location of the imaging device 1000; and the altimeter may obtain the altitude of the imaging device 1000. In some implementations, the metadata sources 1012 may be rigidly coupled to the imaging device 1000 such that any motion, orientation, or change in location experienced by the imaging device 1000 is also experienced by the metadata sources 1012.

The sensor controller 1008 and/or the processor 1002 may be operable to synchronize various types of information received from the metadata sources 1012. For example, timing information may be associated with the sensor data. Using the timing information, metadata information may be related to content (photo/video) captured by the image sensor 1006. In some implementations, the metadata capture may be decoupled from video/image capture. That is, metadata may be stored before, after, and in-between one or more video clips and/or images. In one or more implementations, the sensor controller 1008 and/or the processor 1002 may perform operations on the received metadata to generate additional metadata information. For example, the sensor controller 1008 may integrate the received acceleration information to determine the velocity profile of the imaging device 1000 during the recording of a video. In some implementations, video information may consist of multiple frames of pixels using any applicable encoding method (e.g., H.262, H.264, Cineform, and/or other codec).

The imaging device 1000 may include an electronic storage 1014 (e.g., a storage module of the imaging unit 122). The electronic storage 1014 may include a system memory module that is configured to store executable computer instructions that, when executed by the processor 1002, perform various functionalities including those described herein. The electronic storage 1014 may include a storage memory configured to store content (e.g., metadata, images, audio) captured by the imaging device 1000. The electronic storage 1014 may also be located external to the imaging device 1000.

The electronic storage 1014 may include non-transitory memory configured to store configuration information and/or processing code configured to enable, e.g., video information and metadata capture, and/or to produce a multimedia stream comprised of, e.g., a video track and metadata in accordance with the methodologies of the present disclosure. In one or more implementations, the processing configuration may include capture type (e.g., video, still images), image resolution, frame rate, burst setting, white balance, recording configuration (e.g., loop mode), audio track configuration, and/or other parameters that may be associated with audio, video, and/or metadata capture. Additional memory may be available for other hardware/firmware/software needs of the imaging device 1000. The processor 1002 may interface to the sensor controller 1008 in order to obtain and process sensory information for, e.g., object detection, face tracking, stereo vision, and/or other tasks.

The imaging device 1000 may interface with a user interface (UI) device 1016. The UI device 1016 may include virtually any type of device capable of registering inputs from and/or communicating outputs to the user. These may include, without limitation, display, touch, proximity sensitive interface, light, sound receiving/emitting devices, wired/wireless input devices, and/or other devices. In some implementations, the UI device 1016 may correspond to an external device including but not limited to a smartphone, a tablet computer, a phablet, a smart watch, a portable computer, and/or another device configured to receive user input and communicate information with the imaging device 1000.

In some implementations, the imaging device 1000 may be configured to provide image or video content (or a portion thereof) to the UI device 1016 for processing and/or viewing. The image or video content (or a portion thereof) can be provided by the imaging device 1000 to the UI device 1016 via wired or wireless data transfer (e.g., Bluetooth, WiFi, NFC, cellular, etc.). The wired data transfer of content between the imaging device 1000 and the external device can be established using a USB or micro-USB cable (or a similar connection device) that is connected between an input/output (I/O) module 1018 of the imaging device 1000 and a corresponding I/O module of the external device.

The imaging device 1000 can wirelessly transfer content captured by the imaging device 1000 to an external device including but not limited to a smartphone or to a cloud-based device including but not limited to a cloud-based system and accompanying service. The wireless data transfer can be seamless and automated requiring no intervening user activity. For example, the transfer of content from the imaging device 1000 to the external device can be automated based on a variety of factors including but not limited to predetermined time periods (e.g., automatically transfer content every hour), reaching predetermined wireless connectivity threshold levels (e.g., automatically transfer content when connected to WiFi but garner user approval before transferring content when connected to cellular), detected location of the external device (e.g., wireless transfer when the external device is within 5 feet of the imaging device 1000), and machine learning (e.g., using neural networks) detection of certain situations or moments that warrant wireless data transfer (e.g., while the imaging device 1000 is being charged, the user previously selected for automatic transfer to the external device and so future charging moments will initiate automatic data transfer, etc.).

In addition, the wireless data transfer of content between the imaging device 1000 and an external device (e.g., smartphone) can be activated by an intervening user activity including but not limited to the user selecting a control interface such as a button on the imaging device 1000, the user providing an audio command (e.g., "GoPro transfer my content to my smartphone") received by a sensor (e.g., the sensor 118 comprising a microphone) of the imaging device 1000, the user providing a gesture (e.g., giving a thumbs up sign) received by a sensor (e.g., the sensor 118 comprising a gesture sensor) of the imaging device 1000, and the user viewing at least a portion of the external device within the field-of-view (FOV) of the imaging device 1000 to provide information associated with the external device that is received by the image sensor 1006 and processed by the processor 1002 to initiate the wireless data transfer (e.g., the user uses the imaging device 1000 to view the external device which produces data/information such as an image of the external device and based on a recognition of the external device using the data/information, the wireless data transfer is automatically initiated).

The UI device 1016 may operate a software application configured to perform a variety of operations related to camera configuration, control of video acquisition, image processing, and/or display of video captured by the imaging device 1000. An application (e.g., GoPro App) may enable the user to create short video clips and share video clips to a cloud service (e.g., Instagram, Facebook, YouTube, Dropbox); perform full remote control of functions of the imaging device 1000; live preview video being captured for shot framing; mark key moments while recording (e.g., HiLight Tag); View HiLight Tags in GoPro Camera Roll for location and/or playback of video highlights; wirelessly control camera software; and/or perform other functions. Various methodologies may be utilized for configuring the imaging device 1000 and/or processing or displaying the captured information from the imaging device 1000. Creating short clips, sharing content, uploading to a cloud service, marking key moments while recording, and/or other camera functions may be controlled using any of the UI functionalities described, for example, in respect to the control interface 126 of the wearable imaging device 100.

By way of an illustration, the UI device 1016 may receive a user setting characterizing image resolution (e.g., 3840 pixels by 2160 pixels), frame rate (e.g., 60 frames per second (fps)), and/or other settings (e.g., location) related to the activity (e.g., mountain biking) being captured by the user with the imaging device 1000. The UI device 1016 may then communicate these settings to the imaging device 1000.

A display or display unit (not shown) of the UI device 1016 may act as a viewport into content captured by the imaging device 1000. The display unit can include a variety of displays including but not limited to a LCD display and a LED display. In some implementations, the UI device 1016 may communicate additional information (e.g., metadata) to the imaging device 1000. By way of an illustration, the UI device 1016 may provide orientation of the UI device 1016 with respect to a given coordinate system to the imaging device 1000 so as to enable determination of an orientation and/or dimensions for viewing a portion of the captured content provided by the imaging device 1000.

The display associated with the UI device 1016 may be configured to provide information related to camera operation mode (e.g., image resolution, frame rate, capture mode, sensor mode, video mode, photo mode), connection status (e.g., connected, wireless, wired connection), power mode (e.g., standby, sensor mode, video mode, battery status), information related to metadata sources (e.g., heart rate, GPS), and/or other information.

The UI device 1016 may also include one or more UI interface components, such as the control interface 126 of FIGS. 1-9C, configured to enable the user to start, stop, pause, and/or resume sensor and/or content capture. User commands may be encoded using a variety of approaches including a duration of button press (pulse width modulation), a number of button presses (pulse code modulation), and/or a combination thereof. For example, two short button presses may initiate sensor acquisition mode and a single short button press may be used to communicate (i) initiation of video and/or photo capture and cessation of video and/or photo capture (e.g., toggle mode) or (ii) video and/or photo capture for a given time duration or number of frames (e.g., burst capture). Other user command or communication implementations may also be realized, e.g., short/long button press combinations.

The imaging device 1000 may include the I/O module 1018 (e.g., the I/O module 404 of the wearable imaging device 100). The I/O module 1018 may be configured to synchronize the imaging device 1000 with other cameras and/or with other external devices, such as a remote control, a second capture device, a smartphone, and/or a video server. The I/O module 1018 may be configured to communicate information to/from various I/O components. In some implementations, the I/O module 1018 may include a wired and/or wireless communications interface (e.g., WiFi, Bluetooth, USB, HDMI, Wireless USB, Near Field Communication (NFC), Ethernet, a radio frequency transceiver, and/or other interfaces) configured to communicate to one or more external devices (e.g., UI device 1016 comprising a smartphone and/or another metadata source). In some implementations, the I/O module 1018 may interface with LED lights, a display, a button, a microphone, speakers, and/or other I/O components. In one or more implementations, the I/O module 1018 may interface to an energy source, e.g., a battery and/or a DC electrical source.

The I/O module 1018 of the imaging device 1000 may include one or more connections to external computerized devices to allow for configuration and/or management of either the imaging device 1000 or various remote devices. The I/O module 1018 may include any of the wireless or wireline interfaces discussed above, and further, may include customized or proprietary connections for specific applications. In some implementations, the I/O module 1018 may include a component (e.g., a dongle) comprising an infrared sensor, a radio frequency antenna, an ultrasonic transducer, and/or other communications interfaces. In one or more implementations, the I/O module 1018 may include a local (e.g., Bluetooth, Wi-Fi) and/or broad range (e.g., cellular LTE) communications interface configured to enable communications between the imaging device 1000 and a remote device such as the UI device 1016 described above.

The imaging device 1000 may include a power system (not shown) such as the power source 120 that may be tailored to the needs of the imaging device 1000. For example, a small-sized, lower-power action camera may include a wireless power solution, a removable/replaceable battery, a solar cell, an inductive (contactless) power source, rectification, and/or other power supplies.

Where certain elements of these implementations may be partially or fully implemented using known components, only those portions of such known components that are necessary for an understanding of the present disclosure have been described, and detailed descriptions of other portions of such known components have been omitted so as not to obscure the disclosure.

In the present specification, an implementation showing a singular component should not be considered limiting; rather, the disclosure is intended to encompass other implementations including a plurality of the same component, and vice-versa, unless explicitly stated otherwise herein.

Further, the present disclosure encompasses present and future known equivalents to the components referred to herein by way of illustration.

As used herein, the term "bus" is meant generally to denote all types of interconnection or communication architecture that may be used to communicate data between two or more entities. The "bus" could be optical, wireless, infrared or another type of communication medium. The exact topology of the bus could be for example standard "bus", hierarchical bus, network-on-chip, address-event-representation (AER) connection, or other type of communication topology used for accessing, e.g., different memories in a system.

As used herein, the terms "computer," "computing device," and "computerized device" include, but are not limited to, personal computers (PCs) and minicomputers, whether desktop, laptop, or otherwise, mainframe computers, workstations, servers, personal digital assistants (PDAs), handheld computers, embedded computers, programmable logic device, personal communicators, tablet computers, portable navigation aids, J2ME equipped devices, cellular telephones, smart phones, personal integrated communication or entertainment devices, or literally any other device capable of executing a set of instructions.

As used herein, the term "computer program" or "software" is meant to include any sequence or human or machine cognizable steps which perform a function. Such program may be rendered in virtually any programming language or environment including, for example, C/C++, C#, Fortran, COBOL, MATLAB™, PASCAL, Python, assembly language, markup languages (e.g., HTML, SGML, XML, VoXML), and the like, as well as object-oriented environments such as the Common Object Request Broker Architecture (CORBA), Java™ (including J2ME, Java Beans), Binary Runtime Environment (e.g., BREW), and the like.

As used herein, the terms "connection," "link," "transmission channel," "delay line," and "wireless" mean a causal link between any two or more entities (whether physical or logical/virtual) which enables information exchange between the entities.

As used herein, the terms "integrated circuit," "chip," and "IC" are meant to refer to an electronic circuit manufactured by the patterned diffusion of trace elements into the surface of a thin substrate of semiconductor material. By way of non-limiting example, integrated circuits may include field programmable gate arrays (e.g., FPGAs), a programmable logic device (PLD), reconfigurable computer fabrics (RCFs), systems on a chip (SoC), application-specific integrated circuits (ASICs), and/or other types of integrated circuits.

As used herein, the term "memory" includes any type of integrated circuit or other storage device adapted for storing digital data including, without limitation, ROM, PROM, EEPROM, DRAM, Mobile DRAM, SDRAM, DDR/2 SDRAM, EDO/FPMS, RLDRAM, SRAM, "flash" memory (e.g., NAND/NOR), memristor memory, and PSRAM.

As used herein, the terms "microprocessor" and "digital processor" are meant generally to include digital processing devices. By way of non-limiting example, digital processing devices may include one or more of digital signal processors (DSPs), reduced instruction set computers (RISC), general-purpose (CISC) processors, microprocessors, gate arrays (e.g., field programmable gate arrays (FPGAs)), PLDs, reconfigurable computer fabrics (RCFs), array processors, secure microprocessors, application-specific integrated circuits (ASICs), and/or other digital processing devices. Such digital processors may be contained on a single unitary IC die, or distributed across multiple components.

As used herein, the term "network interface" refers to any signal, data, and/or software interface with a component, network, and/or process. By way of non-limiting example, a network interface may include one or more of FireWire (e.g., FW400, FW110, and/or other variation.), USB (e.g., USB2), Ethernet (e.g., 10/100, 10/100/1000 (Gigabit Ethernet), 10-Gig-E, and/or other Ethernet implementations), MoCA, Coaxsys (e.g., TVnet™), radio frequency tuner (e.g., in-band or OOB, cable modem, and/or other protocol), Wi-Fi (802.11), WiMAX (802.16), PAN (e.g., 802.15), cellular (e.g., 3G, LTE/LTE-A/TD-LTE, GSM, and/or other cellular technology), IrDA families, and/or other network interfaces.

As used herein, the term "Wi-Fi" includes one or more of IEEE-Std. 802.11, variants of IEEE-Std. 802.11, standards related to IEEE-Std. 802.11 (e.g., 802.11 a/b/g/n/s/v), and/or other wireless standards.

As used herein, the term "wireless" means any wireless signal, data, communication, and/or other wireless interface. By way of non-limiting example, a wireless interface may include one or more of Wi-Fi, Bluetooth, 3G (3GPP/3GPP2), HSDPA/HSUPA, TDMA, CDMA (e.g., IS-95A, WCDMA, and/or other wireless technology), FHSS, DSSS, GSM, PAN/802.15, WiMAX (802.16), 802.20, narrowband/FDMA, OFDM, PCS/DCS, LTE/LTE-A/TD-LTE, analog cellular, CDPD, satellite systems, millimeter wave or microwave systems, acoustic, infrared (i.e., IrDA), and/or other wireless interfaces.

As used herein, the term "robot" may be used to describe an autonomous device, autonomous vehicle, computer, artificial intelligence (AI) agent, surveillance system or device, control system or device, and/or other computerized device capable of autonomous operation.

As used herein, the term "camera" may be used to refer to any imaging device or sensor configured to capture, record, and/or convey still and/or video imagery which may be sensitive to visible parts of the electromagnetic spectrum, invisible parts of the electromagnetic spectrum (e.g., infrared, ultraviolet), and/or other energy (e.g., pressure waves).

While certain aspects of the technology are described in terms of a specific sequence of steps of a method, these descriptions are only illustrative of the broader methods of the disclosure and may be modified as required by the particular application. Certain steps may be rendered unnecessary or optional under certain circumstances. Additionally, certain steps or functionality may be added to the disclosed implementations, or the order of performance of two or more steps permuted. All such variations are considered to be encompassed within the disclosure.

While the above detailed description has shown, described, and pointed out novel features of the disclosure as applied to various implementations, it will be understood that various omissions, substitutions, and changes in the form and details of the devices or processes illustrated may be made by those skilled in the art without departing from the disclosure. The foregoing description is in no way meant to be limiting, but rather should be taken as illustrative of the general principles of the technologies.

What is claimed is:

1. A device, comprising:
   a frame comprising first and second openings and a pair of temple arms that pivot relative to the frame;
   an imaging unit configured to connect to the frame at a location adjacent to the first opening and capture images through the first opening;
   a mechanical switch disposed on the frame or the imaging unit adjacent to the first opening;
   lenses configured to fit within the first and second openings, wherein the lens that fits within the first opening comprises a key interfaceable with the mechanical switch and configured to adjust firmware of the imaging unit based on physical features of the lenses upon interface with the mechanical switch; and
   a lens housing positioned within a cutout of the lens disposed within the first opening and configured to configured to seal an imaging lens of the imaging unit against an external environment.

2. The device of claim 1, further comprising:
   an electronics unit positioned on a portion of the frame adjacent to the second opening and in electronic communication with the imaging unit.

3. The device of claim 2, wherein the electronics unit further comprises an electronic tag reader configured to control the firmware of the imaging unit based on the physical features of the lenses, and wherein the lenses comprise an electronic tag configured to adjust the firmware of the imaging unit based on the physical features of the lenses.

4. The device of claim 3, wherein the physical features comprise tint, prescription, reflectivity, shape, or any combination thereof.

5. The device of claim 2, wherein the key includes shaped features having a pattern that directs adjustment of the firmware.

6. The device of claim 5, wherein the pattern is arranged in a series of nubs separated by spaces.

7. The device of claim 2, further comprising:
an input/output module disposed on the imaging unit or the electronics unit that includes a communications interface connectable with one or more external devices.

8. The device of claim 1, wherein the lens housing is integrated within the lens of the lenses disposed within the first opening.

9. The device of claim 1, wherein the lenses are interchangeable with other lenses so another key is usable to interface with the mechanical switch to adjust the firmware of the imaging unit based on physical features of the lenses.

10. A wearable imaging device, comprising:
a frame having openings;
an imaging unit connected with the frame at a location adjacent to one of the openings;
an electronics unit connected with the frame and in communication with the imaging unit, wherein the electronics unit comprises an electronic tag reader;
a mechanical switch disposed on or in the frame;
a power source disposed on the frame and providing power to the imaging unit and to the electronics unit; and
a pair of lenses disposed within the openings, one of the lenses of the pair of lenses comprising a key interfaceable with the mechanical switch and configured to control firmware settings of the imaging unit based on physical features of the pair of lenses, wherein at least one of the lenses in the pair of lenses comprises an electronic tag configured to adjust the firmware settings of the imaging unit based on the physical features of the pair of lenses.

11. The wearable imaging device of claim 10, further comprising:
a communications interface coupled to the frame and providing communications with one or more external devices.

12. The wearable imaging device of claim 10, wherein the mechanical switch is associated with the electronics unit, the imaging unit, or both.

13. The wearable imaging device of claim 10, wherein the key includes an arrangement of nubs that are spaced a distance apart in a predetermined pattern.

14. The wearable imaging device of claim 10, wherein the imaging unit comprises an imaging lens and, wherein one of the pairs of lenses comprises a lens housing configured to seal the imaging lens against an external environment.

15. A wearable imaging device, comprising:
a frame having openings;
an imaging unit comprising an imaging lens configured to capture images through one of the openings;
a communications interface in communication with the imaging unit, the communications interface configured to receive commands from a user to operate the imaging unit;
a power source configured to supply power to the imaging unit and/or the communications interface; and
frame lenses disposed within the openings, one of the frame lenses comprising a lens housing configured to seal the imaging lens against an external environment.

16. The wearable imaging device of claim 15, wherein the lens housing is positioned within a cutout that is defined within the one of the frame lenses and is associated with sealing the imaging lens of the imaging unit against the external environment.

17. The wearable imaging device of claim 15, wherein the lens housing is fashioned within the one of the frame lenses and is associated with sealing the imaging lens of the imaging unit against the external environment.

18. The wearable imaging device of claim 15, further comprising:
an electronics unit in communication with the power source, the imaging unit, and/or the communication interface, the electronics unit configured to facilitate commands between the power source, the imaging unit, and/or the communications interface.

19. The wearable imaging device of claim 15, wherein the imaging lens has a rounded shape, and wherein the lens housing has an outer surface having a flat shape so that images captured by the imaging unit are not altered by a presence of water.

20. The wearable imaging device of claim 15, further comprising:
a mechanical switch disposed on or in the frame,
wherein one of the frame lenses comprise:
a key interfaceable with the mechanical switch and configured to control firmware settings of the imaging unit based on physical features of the frame lenses.

* * * * *

UNITED STATES PATENT AND TRADEMARK OFFICE
CERTIFICATE OF CORRECTION

| | | |
|---|---|---|
| PATENT NO. | : 11,668,938 B2 | Page 1 of 1 |
| APPLICATION NO. | : 17/488513 | |
| DATED | : June 6, 2023 | |
| INVENTOR(S) | : Nicholas D. Woodman, Daniel J. Coster and Joshua T. Druker | |

It is certified that error appears in the above-identified patent and that said Letters Patent is hereby corrected as shown below:

On the Title Page

Line 4 item [57]:
Replace "and capture" with --that captures--

Signed and Sealed this
Eighth Day of October, 2024

Katherine Kelly Vidal
*Director of the United States Patent and Trademark Office*